US008606261B2

(12) United States Patent
Weng et al.

(10) Patent No.: US 8,606,261 B2
(45) Date of Patent: Dec. 10, 2013

(54) METHOD AND SYSTEM FOR FREQUENCY SCAN USING A DIFFERENTIAL POWER METRIC

(75) Inventors: Jianfeng Weng, Ottawa (CA); Jason Robert Duggan, Ottawa (CA); Timothy James Creasy, Ottawa (CA)

(73) Assignee: BlackBerry Limited, Waterloo (CA)

( * ) Notice: Subject to any disclaimer, the term of this patent is extended or adjusted under 35 U.S.C. 154(b) by 361 days.

(21) Appl. No.: 13/089,866

(22) Filed: Apr. 19, 2011

(65) Prior Publication Data

US 2012/0270537 A1   Oct. 25, 2012

(51) Int. Cl.
*H04W 24/00* (2009.01)
(52) U.S. Cl.
USPC .......................................................... 455/424
(58) Field of Classification Search
USPC .......... 455/436.1–3, 436–444, 434, 418, 424;
370/329; 375/260, 224
See application file for complete search history.

(56) References Cited

U.S. PATENT DOCUMENTS

| | | | | |
|---|---|---|---|---|
| 2004/0116110 | A1* | 6/2004 | Amerga et al. | 455/422.1 |
| 2005/0068928 | A1 | 3/2005 | Smith et al. | |
| 2010/0254470 | A1* | 10/2010 | Kim et al. | 375/260 |
| 2010/0279638 | A1 | 11/2010 | Lindoff | |
| 2012/0190352 | A1* | 7/2012 | Huang | 455/418 |
| 2013/0017828 | A1* | 1/2013 | Weng et al. | 455/434 |
| 2013/0121279 | A1* | 5/2013 | Noh et al. | 370/329 |

FOREIGN PATENT DOCUMENTS

| | | |
|---|---|---|
| WO | 2004/010719 A1 | 1/2004 |
| WO | 2009/095369 A1 | 8/2009 |
| WO | 2009/096846 A1 | 8/2009 |

OTHER PUBLICATIONS

European Search Report for corresponding European Patent Application No. 11162968.9, dated Sep. 29, 2011, 6 pages.
European Search report for related European Patent Application No. 11173487.7, dated Nov. 16, 2011, 9 pages.
"3GPP TS 36.211 V8.6.0: 3rd Generation Partnership Project; Technical Specification Group Radio Access Network; Evolved Universal Terrestrial Radio Access (E-UTRA); Physical Channels and Modulation (Release 8)", 3GPP TS 36.211 V8.6.0, vol. 36.211, No. V8.6.0, Mar. 1, 2009, URL: http://www.3gpp.org/ftp/Specs/archive/36_series/36.211/, 82 pages.
"3rd Generation Partnership Project; Technical Specification Group Radio Access Network; Evolved Universal Terrestrial Radio Access (E-UTRA); Physical layer; Measurements (Release 9)", 3GPP Standard; 3GPP TS 36.214, 3rd Generation Partnership Project (3GPP), Mobile Competence Centre; No. V9.2.0, Jun. 14, 2010, 14 pages.

(Continued)

*Primary Examiner* — Melody Mehrpour

(57) ABSTRACT

Described herein are methods and devices for use in telecommunication cell selection and re-selection for which there may be multiple different sizes of transmission bandwidth configurations in a telecommunications operating band. For each of a plurality of channel hypotheses, in which each channel hypothesis has a hypothetical occupied portion and a hypothetical guard band portion, a respective metric is calculated based on a power value for the hypothetical occupied portion and a power value for the hypothetical guard band portion. Based on the metrics determined for the plurality of channel hypotheses, at least one channel hypothesis is selected for further processing for cell selection or re-selection. The metric is calculated by determining a difference between the power value for the hypothetical occupied portion and the power value for the hypothetical guard band portion.

24 Claims, 14 Drawing Sheets

(56) References Cited

OTHER PUBLICATIONS

Lim, H. et al., "Initial synchronization for WiBro", IEEE Asia-Pacific Conf. Commun., pp. 284-288, Oct. 2005.

Lee, K.M. et al., "An initial cell search scheme robust to frequency error in W-CDMA system", IEEE Int. Symposium Personal, Indoor and Mobile Radio Commun., vol. 2, pp. 1400-1404, Aug. 2002.

Nielsen, A. O. et al., "WCDMA initial cell search", IEEE Vehicular Tech. Conf. Fall, vol. 1, pp. 377-383, 2000.

Li, C. F. et al., "Cell search in WCDMA under large-frequency and clock errors: algorithms to hardware implementation", IEEE Trans. Circuits and Systems, vol. 55. No. 2, pp. 659-671, Mar. 2008.

Rohde-Schwarz application note: "Cell search and cell selection in UMTS LTE", http://www2.rohde-schwarz.com/file__12728/1MA150_0E.pdf, 40 pages.

SOMA, "Mobility Prediction Project", http://lia.deis.unibo.it/Research/SOMA/MobilityPrediction/overview.shtml, 1 page.

SOMA, "Mobility and handover prediction mechanism: a performance comparison exploiting several filters", http://lia.deis.unibo.it/Research/SOMA/MobilityPrediction/filters.shtml, 6 pages.

Benetazzo, L. et al., "Enhanced use of RSSI-based wireless network nodes for power measurement purposes", Instrumentation and Measurement Tech. Conf., I2MTC'09, pp. 1037-1042, http://ieeexplore.ieee.org/stamp/stamp.jsp?arnumber=5168606.

Wu, H. et al., "Proactive scan: fast handoff with smart triggers for 802.11 wireless LAN", IEEE Int. Conf. Computer Commun., pp. 749-757, 2007, http://ieeexplore.ieee.org/stamp/stamp.jsp?arnumber=4215675.

\* cited by examiner

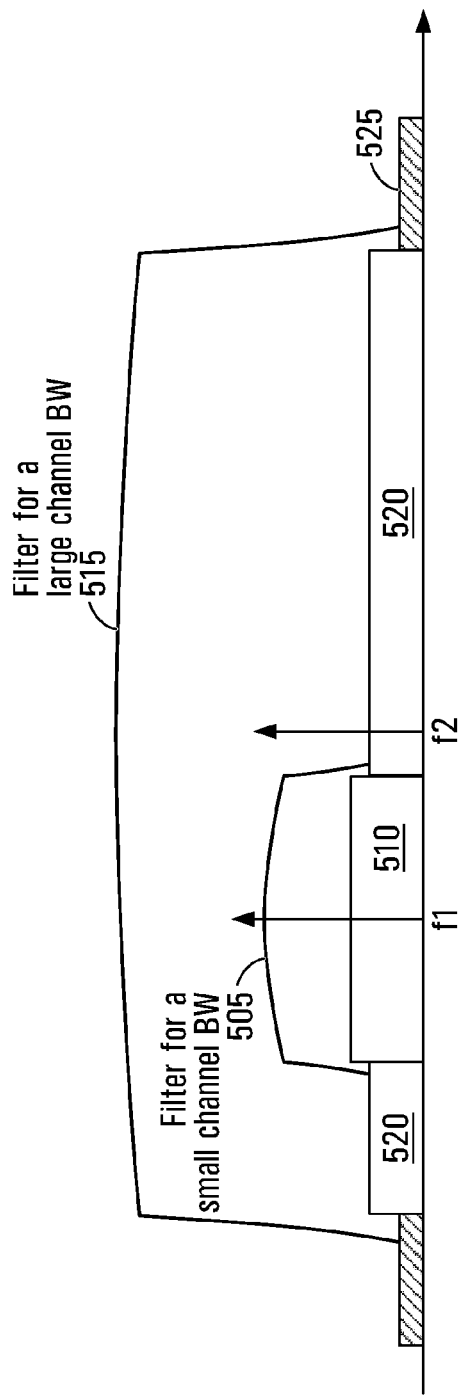
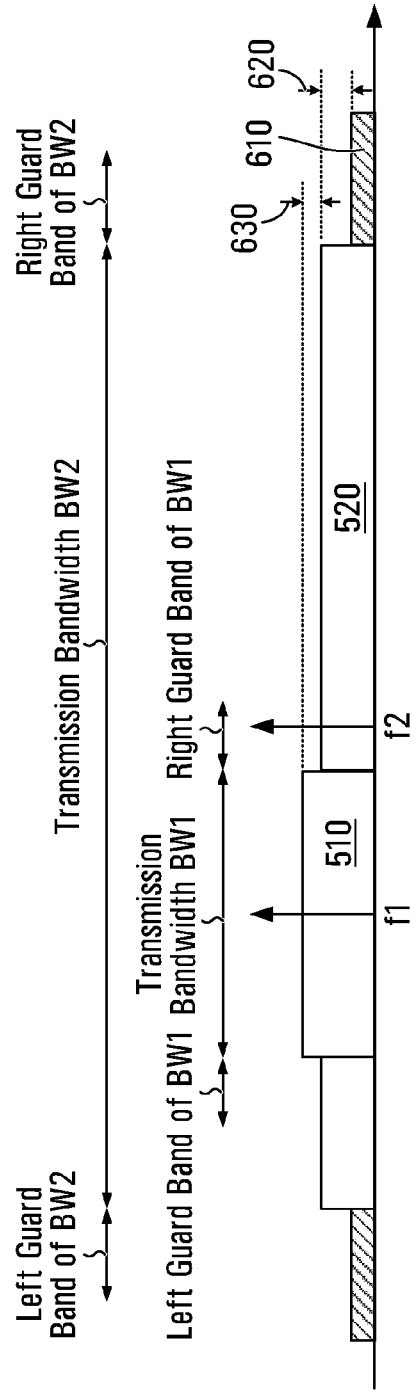

METHOD AND SYSTEM FOR FREQUENCY SCAN USING A DIFFERENTIAL POWER METRIC

TECHNICAL FIELD

The application relates to cell selection and re-selection using a Differential Power Frequency Scan.

BACKGROUND

Initial cell selection is a procedure for a wireless device to determine the presence of a wireless network and find a suitable cell via which to access the network. In the initial cell selection, the wireless device scans a list of possible carrier frequencies of configured operating bands, searches for the cell with the strongest signal strength, finds a cell identification number for the cell with the strongest signal strength, and detects the channel bandwidth and other broadcast information, such as a public land mobile network (PLMN) identification number for that cell. Having found a suitable cell via which to access the network, the wireless device also needs to regularly perform a cell reselection procedure to search for a potentially better cell, which may use a different frequency, via which to access the network. The time required for initial cell selection impacts the end user experience. The time for cell reselection in particular is an important contributing factor to the power consumption of a wireless device.

To speed up the carrier frequency scan, a received signal strength indicator (RSSI) based carrier frequency scan may be employed and the carrier frequencies with strong RSSIs are identified for further cell identification. However, the conventional RSSI scan does not work well for Long Term Evolution/Evolved UMTS Terrestrial Radio Access (LTE/E-UTRA) where the channel bandwidth is unknown a priori; specifically the channel bandwidth can be one of six possible channel bandwidths, i.e. 1.4 MHz, 3 MHz, 5 MHz, 10 MHz, 15 MHz, or 20 MHz. Also, the conventional RSSI scan cannot directly detect the channel bandwidth being used from six possible channel bandwidths.

BRIEF DESCRIPTION OF THE DRAWINGS

Embodiments of the application will now be described with reference to the attached drawings in which:

FIG. 5 is a schematic diagram illustrating an impact of RSSI spectral density variation;

FIG. 6 is a schematic diagram illustrating an impact of performing a differential RSSI carrier frequency scan according to some embodiments of the application;

DETAILED DESCRIPTION

Figure 1:
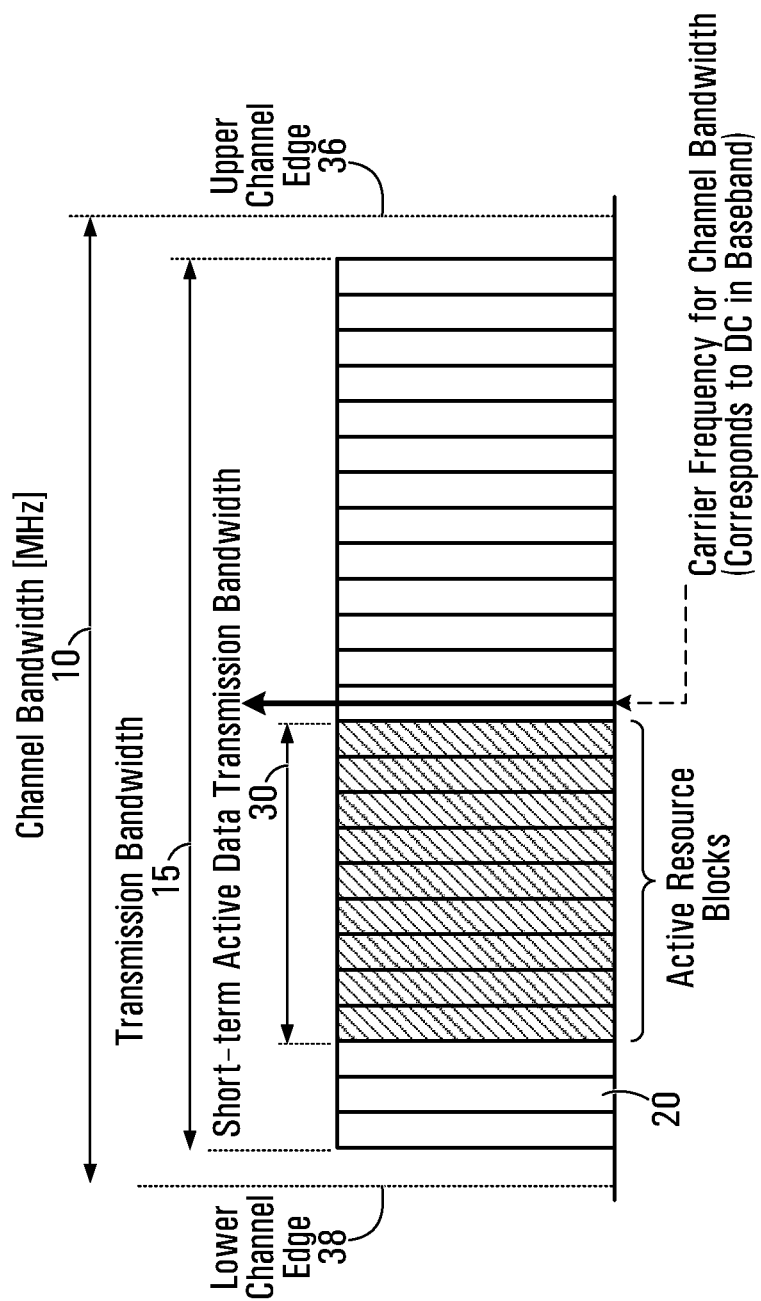
FIG. 1 is a schematic diagram of an example E-UTRA carrier.

According to an aspect of the application, there is provided a method comprising: for each of a plurality of channel hypotheses, each channel hypothesis having a hypothetical occupied portion and a hypothetical guard band portion, calculating a respective metric based on a power value for the hypothetical occupied portion and a power value for the hypothetical guard band portion; and based on the metrics determined for the plurality of channel hypotheses, selecting at least one channel hypothesis for further processing for cell selection or re-selection.

In some embodiments, the method further comprises for each of the at least one channel hypothesis selected for further processing, attempting to perform at least one of: detecting a reference signal within a bandwidth defining the channel hypothesis; detecting a synchronization signal within a bandwidth defining the channel hypothesis; and identifying a cell operating within a bandwidth defining the channel hypothesis.

In some embodiments, calculating a respective metric comprises: determining a power value in each of a plurality of frequency bins defining an operating band that contains all of the hypothetical occupied portions and hypothetical guard band portions.

In some embodiments, calculating a respective metric comprises: for each hypothetical occupied portion, determining the power value for the hypothetical occupied portion based on the power values of a subset of the plurality of frequency bins, the subset collectively forming the hypothetical occupied portion; and for each hypothetical guard band portion, determining the power value for the hypothetical guard band portion based on the power values of a subset of the plurality of frequency bins, the subset collectively forming the hypothetical guard band portion.

In some embodiments, determining the respective metric is based on a difference between the power value for the hypothetical occupied portion and the power value for the hypothetical guard band portion.

In some embodiments, the difference comprises: a sum of power values for the subset of the plurality of frequency bins for the hypothetical occupied portion divided by a number of frequency bins in the hypothetical occupied portion minus a sum of power values for the subset of the plurality of frequency bins for the hypothetical guard band portion divided by a number of frequency bins in the hypothetical guard band portion.

In some embodiments, the difference comprises: a logarithm of the ratio of a sum of power values for the subset of the plurality of frequency bins for the hypothetical occupied portion to a number of frequency bins in the hypothetical occupied portion minus a logarithm of the ratio of a sum of power values for the subset of the plurality of frequency bins for the hypothetical guard band portion to a number of frequency bins in the hypothetical guard band portion.

In some embodiments, determining power in each frequency bin comprises: filtering a received signal with a narrowband filter having a bandwidth substantially equal to a bandwidth of the frequency bin; and measuring the power of the frequency bin.

In some embodiments, calculating a respective metric comprises: performing at least one discrete Fourier transform (DFT) to produce a power value for each of a plurality of frequency bins.

In some embodiments, calculating a respective metric comprises: for each hypothetical occupied portion, determining the power value for the hypothetical occupied portion based on the power values of a subset of the plurality of frequency bins, the subset collectively forming the hypothetical occupied portion; and for each hypothetical guard band portion, determining the power value for the hypothetical guard band portion based on the power values of a subset of the plurality of frequency bins, the subset collectively forming the hypothetical guard band portion.

In some embodiments, performing at least one DFT comprises performing a respective DFT for each of at least two bandwidths that collectively form an operating band that contains all of the hypothetical occupied portions and hypothetical guard band portions.

In some embodiments, selecting the at least one channel hypothesis for further processing comprises: arranging the metrics and selecting $N_f$ metrics, where $N_f \geq 1$, each associated with a channel hypothesis, in order of magnitude of the metrics; and selecting at least one of the $N_f$ channel hypotheses based on a largest magnitude metric.

In some embodiments, the power value for the hypothetical occupied portion and the power value for the hypothetical guard band portion are each expressed in logarithmic form.

In some embodiments, the plurality of channel hypotheses comprise channel hypotheses for two or more different sized bandwidths located at each of a plurality of carrier frequencies in an operating band that contains all of the hypothetical occupied portions and hypothetical guard band portions.

In some embodiments, the two or more different sized bandwidths comprise bandwidths equal to at least two of: 1.4 MHz; 3 MHz; 5 MHz; 10 MHz; 15 MHz; and 20 MHz.

In some embodiments, determining a power value in each of a plurality of frequency bins comprises performing multiple power measuring passes of the frequency bins in the operating band.

In some embodiments, determining a power value in each of a plurality of frequency bins comprises performing a received signal strength indicator (RSSI) measurement for each of the frequency bins.

In some embodiments, a delay is included between consecutive passes of the multiple power measuring passes.

In some embodiments, the delay time is increased with each consecutive pass.

In some embodiments, a start of a hypothetical guard band portion may be adjusted by moving it away from a nominal transmission band edge by a margin corresponding to a maximum expected frequency offset.

In some embodiments, the method further comprises, upon determining the respective metric: stopping evaluation of candidate carrier frequencies early if the metric exceeds a threshold; and proceeding directly to searching for synchronization signals.

According to a further aspect of the application, there is provided a computer-readable medium having stored thereon computer executable instructions for performing a method described above or detailed below.

According to another aspect of the application, there is provided a wireless device comprising: a processor; a power difference calculation function configured to: for each of a plurality of channel hypotheses, each channel hypothesis having a hypothetical occupied portion and a hypothetical guard band portion, calculate a respective metric based on a power value for the hypothetical occupied portion and a power value for the hypothetical guard band portion; based on the metrics determined for the plurality of channel hypothesis, select at least one channel hypothesis for further processing.

In some embodiments, the power difference calculation function configured to calculate a respective metric is configured to: determine a power value in each of a plurality of frequency bins defining an operating band that contains all of the hypothetical occupied portions and hypothetical guard band portions.

In some embodiments, the power difference calculation function configured to calculate a respective metric is configured to: for each hypothetical occupied portion, determine the power value for the hypothetical occupied portion based on the power values of a subset of the plurality of frequency bins, the subset collectively forming the hypothetical occupied portion; and for each hypothetical guard band portion, determine the power value for the hypothetical guard band portion based on power values of a plurality of frequency bins, the subset collectively forming the hypothetical guard band portion.

In some embodiments, the power difference calculation function configured to calculate a respective metric is configured to: determine the respective metric based on a difference between the power value for the hypothetical occupied portion and the power value for the hypothetical guard band portion.

In some embodiments, the power difference calculation function configured to determine a power value in each of a plurality of frequency bins is configured to: for each frequency bin, wherein the filter is a narrowband filter having a bandwidth substantially equal to the bandwidth of the frequency bin, filter a received signal with the narrowband filter; and measure the power of the frequency bin.

In some embodiments, the wireless device comprises a spectrum analyzer configured to: perform at least one discrete Fourier transform (DFT) to produce a power value for each of a plurality of frequency bins.

In some embodiments, the spectrum analyzer is configured to: perform a respective DFT for each of at least two bandwidths that collectively form an operating band that contains all of the hypothetical occupied portions and hypothetical guard band portions.

In some embodiments, the power difference calculation function configured to select the at least one carrier frequency is configured to: arrange the metrics and select $N_f$ metrics, where $N_f \geq 1$, each associated with a channel hypothesis, in order of magnitude of the metrics; and select at least one of the $N_f$ channel hypotheses based on a largest magnitude metric.

In some embodiments, the power difference calculation function is configured to calculate a respective metric wherein the power value for the hypothetical occupied portion and the power value for the hypothetical guard band portion are each expressed in logarithmic form.

In some embodiments, the power difference calculation function configured to determine power is further configured to: perform multiple power measuring passes of the frequency bins in an operating band that contains all of the hypothetical occupied portions and hypothetical guard band portions.

In some embodiments, the power difference calculation function configured to determine power in a plurality of frequency bins is further configured to: perform a received signal strength indicator (RSSI) measurement for each of the frequency bins.

Many of the example embodiments described herein pertain to E-UTRA (Release 8). However, solutions described herein may be applicable to any radio access technology where some form of initial cell search in an operating band with multiple channels and multiple channel bandwidths is utilized. As such, the solutions would be applicable to, but not limited to, technologies such as: LTE/E-UTRA; WiMAX; WCDMA; and CDMA. Furthermore, while many of the examples described herein pertain to wireless devices, either fixed or mobile, the subject matter described herein may also be equally applicable to some forms of wireline communications.

While reference is made below to an E-UTRA UE, it is to be considered that more generally a UE can be a wireless communication device that is compatible with other non-E-UTRA communication systems. The UE may be, but is not limited to, a fixed or mobile wireless terminal, a cellular telephone, a wirelessly enabled computer, a wirelessly enabled gaming machine and a personal data assistant (PDA).

E-UTRA supports six different size channel bandwidths. A list of supported channel bandwidths and the transmission bandwidth configuration NRB (number of resource blocks) are tabulated in Table 1 below. In Table 1, "Channel bandwidth" is the size of a channel including portions that can be occupied and portions that act as guard bands, "Transmission bandwidth configuration NRB" is the maximum number of resource blocks in the occupied portion of the transmission bandwidth, and "Transmission bandwidth" is a portion of the Channel bandwidth that is occupied, up to a maximum of the Channel bandwidth minus any guard band portions. The contents of Table 1 are purely an exemplary list of bandwidths and it is to be understood that the methodologies described herein could apply to any reasonable number and size of bandwidths with distinct bandwidth values.

In a particular implementation of E-UTRA a resource block (RB) is a block of 12 consecutive subcarriers over one time slot. More generally, an RB is a group of physically adjacent subcarriers. For example in E-UTRA one time slot equals 0.5 ms. Further details on the definition of RB and subcarriers for a given implementation can be found in 3GPP TS 36.211 "$3^{rd}$ Generation Partnership Project; Technical Specification Group Radio Access Network; Evolved Universal Terrestrial Radio Access (E-UTRA); Physical channels and modulation (Release 8)". In some embodiments, which may or may not be E-UTRA compatible, it may be possible that the carriers are logically grouped carriers, some of which may be physically adjacent and others that are not.

TABLE 1

E-UTRA channel bandwidths and transmission bandwidth configuration NRB

| | Channel bandwidth BWChannel [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |
| Transmission bandwidth (MHz) | 1.08 | 2.7 | 4.5 | 9 | 13.5 | 18 |

With reference to FIG. 1, a relation between channel bandwidth (in MHz) 10 and transmission bandwidth configuration 15 in number of RBs is shown in FIG. 1. FIG. 1 is a particular example that illustrates twenty-five resource blocks in an occupied portion of the channel bandwidth 10, an exemplary RB is indicated by reference number 20. In FIG. 1, nine of the resource blocks are illustrated as active resource blocks that make up a short-term active data transmission bandwidth 30. In FIG. 1 the short-term active data transmission bandwidth 30 is not the maximum transmission bandwidth that would be possible, i.e. all twenty-five resource blocks. More generally, it is to be understood that anywhere from zero to the total number of resource blocks defined by the transmission bandwidth configuration NRB value could be active resource blocks in any given time slot (0.5 ms). Upper 36 and lower 38 channel edges define the edges of the channel bandwidth 10. In this example, all 25 RBs will contain reference signals (RS) and thus will contribute to an RSSI measurement. The nine active resource blocks that make up the short-term active data transmission bandwidth 30 are resource blocks that carry data in addition to the RS. In LTE downlink the number of active RBs can change as frequently as every subframe (1 ms) and the location of the active RBs within the transmission bandwidth 15 can change as frequently as every time slot (0.5 ms).

E-UTRA is designed to operate in various operating bands from 700 MHz to 2.6 GHz as specified in 3GPP TS 36.101 "$3^{rd}$ Generation Partnership Project; Technical Specification Group Radio Access Network; Evolved Universal Terrestrial Radio Access (E-UTRA); User Equipment (UE) radio transmission and reception (Release 8)". The bandwidths of those operating bands may vary from 10 MHz to 100 MHz.

Within an operating band, different channel bandwidths can be used. In some implementations, each channel has a carrier frequency that is constrained to be an integer multiple of the E-UTRA channel frequency raster (=100 kHz) for all operating bands. The carrier frequency is designated by the E-UTRA Absolute Radio Frequency Channel Number (EARFCN). The E-UTRA channel numbers can be found in 3GPP TS 36.101 "$3^{rd}$ Generation Partnership Project; Technical Specification Group Radio Access Network; Evolved Universal Terrestrial Radio Access (E-UTRA); User Equipment (UE) radio transmission and reception (Release 8)".

Figure 2:
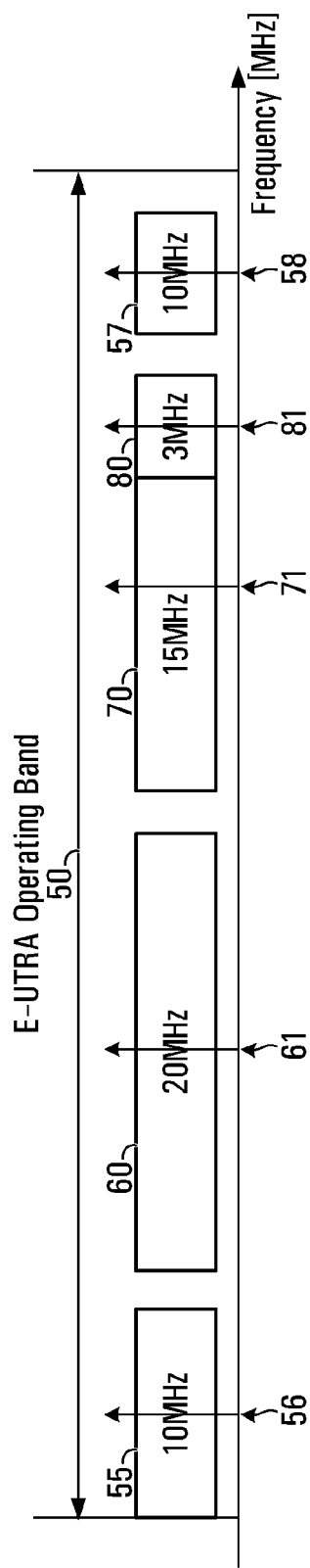
FIG. 2 is a schematic diagram of an example combination of different channel bandwidths in a single operating band.

FIG. 2 illustrates an exemplary E-UTRA operating band 50 divided into multiple channels. Shown within the operating band 50 is a first 10 MHz channel 55 having a carrier frequency 56, a 20 MHz channel 60 having a carrier frequency 61, a 15 MHz channel 70 having a carrier frequency 71, a 3 MHz channel 80 having a carrier frequency 81 and a second 10 MHz channel 57 having a carrier frequency 58. There are also gaps between some of the channels illustrated in FIG. 2. The gaps are not indicated to be of a particular size in FIG. 2. In the particular example of FIG. 2 the carrier frequencies are integer multiples of a frequency raster, which in E-UTRA is 100 kHz. It is to be understood that while the carrier frequencies in the example of FIG. 2 are standard specific, the carrier frequencies may be any desirable value.

More generally, an operating band may include any combination of channel bandwidths having associated carrier frequencies that fit within the operating band. There may be more than one of the same size channel bandwidths in the operating band. There may be none of a particular size channel bandwidth of a group of different size channel bandwidths in the operating band; that is, not all of the known sizes of the different size channel bandwidths will necessarily be included in an operating band. The size and configuration of channel bandwidths in an operating band are deployment specific. In addition, the number and size of gaps which may occur between channels within the operating band or between channels and the operating band edge are deployment specific.

A telecommunication cell may transmit a set of synchronization signals, such as primary synchronization signal (PSS) and secondary synchronization signal (SSS), which are broadcast within the configured transmission band on a regular basis. Such synchronization signals can be used by a wireless device when performing cell selection and re-selection.

A telecommunication cell may transmit a set of cell specific reference signals (RS), which are broadcast within the configured transmission band on a regular basis. Such reference signals may aid in the identification of the telecommunication cell. In some implementations, such as certain time division duplex (TDD) or Multimedia Broadcast-Multicast Service Single Frequency Network (MBSFN) subframes the RS transmission may be suppressed for some subframes or portions thereof.

The reference signals are scattered in a two-dimensional transmission resource having a time dimension and a frequency dimension. For example, in a particular implementation, in the time dimension, each subframe has two time slots. Within each slot, there are 7 OFDM symbols with a normal cyclic prefix (CP) case or 6 OFDM symbols with an extended CP case. Also as an example, in the frequency dimension, there may be NRB*12 subcarriers having 15 kHz subcarrier spacing, where NRB is the number of RB configured for the downlink transmission and 12 is the number of subcarriers per RB. More generally, the number of subcarriers and subcarrier spacing are deployment specific.

A transmission resource may be divided into frames and subframes. Within each subframe, a subset of resource elements (RE) are selected to carry the reference signals. As an example one RE may refer to a time/frequency location of the two-dimensional transmission resource made up of one OFDM symbol in the time dimension and one subcarrier in the frequency dimension. In some implementations of E-UTRA, several OFDM symbols within one subframe and one out of every six subcarriers within the selected OFDM symbol are used to carry the reference signals.

When an E-UTRA user equipment (UE) is powered on, the UE needs to perform an initial cell selection to find a suitable cell via which to access the network. Subsequent to the initial cell selection, the device needs to regularly perform cell re-selection to search for a potentially better cell to camp on. In both the initial cell selection and the cell re-selection, the device may scan a list of the candidate carrier frequencies, searching for the cell with the strongest reception, and determining a cell identification number for the cell with the strongest reception. The device may perform a synchronization detection search based on, for example, the cell identification number for the cell with the strongest reception.

Prior to accessing a cellular network, a UE may not have reliable information about the carrier frequencies of the cells in its proximity. Furthermore, in systems such as E-UTRA where the channel bandwidth is not fixed, the channel bandwidth of each cell may also be unknown to the UE. As such, every possible carrier frequency as designated by E-UTRA is a candidate for cell selection or re-selection. One possible carrier frequency scan approach is an exhaustive scan, which involves a search for an E-UTRA downlink synchronization signal, i.e., PSS and SSS, at all possible carrier frequencies. Normally, the exhaustive scan can be computationally expensive and time consuming. One way to circumvent that is to do a received signal strength indicator (RSSI) frequency scan first and select the carrier frequency candidates with the strongest RSSI for further cell identification and search for synchronization signals. An example of the RSSI scan procedure is discussed in further detail with reference to FIG. 3.

Figure 3:
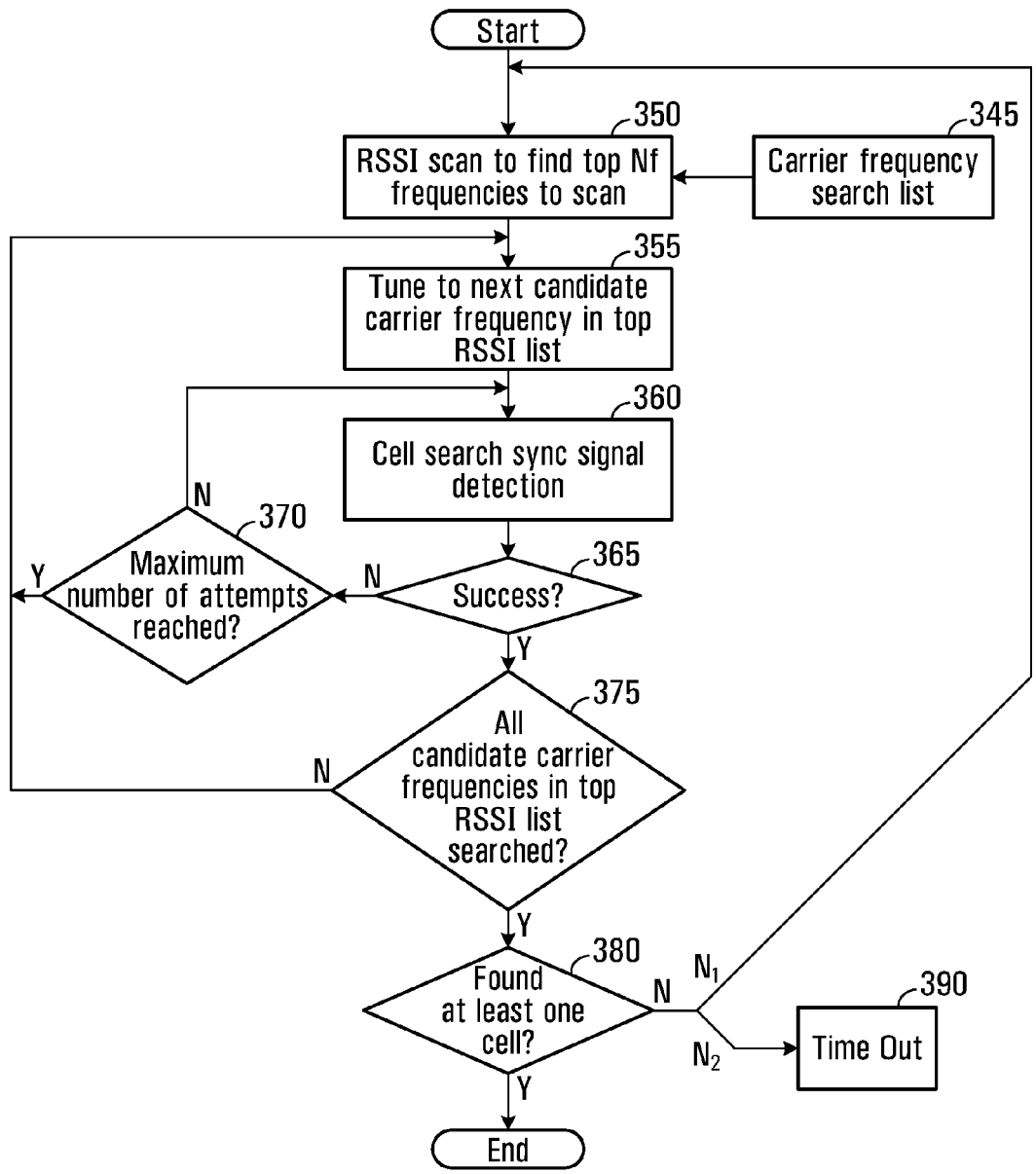
FIG. 3 is a flow chart illustrating a method for an RSSI frequency scan approach.

Referring to FIG. 3, steps for the conventional RSSI scan include a first step 350 illustrated in the flow chart that involves performing an RSSI scan for all candidate carrier frequencies in the operating band to find the top $N_f$ frequencies to search, namely the $N_f$ carrier frequencies having the strongest signal strengths. A list of candidate carrier frequencies on which to perform the RSSI scan may be received from a carrier frequency search list 345. A next step 355 illustrated in the flow chart involves tuning to a next carrier frequency, which then becomes the current candidate carrier frequency, in the top $N_f$ frequencies list (hereafter referred to as the "RSSI list"). A further step 360 involves performing a cell search to detect a synchronization signal for the current candidate carrier frequency. Step 365 includes determining if the cell search is successful for the current candidate carrier frequency. If the cell search is unsuccessful, "N" path of step 365, the method proceeds to step 370. Step 370 includes determining if a maximum number of attempts have been reached for identifying a cell on the current carrier frequency. If the maximum number of attempts has been reached, "Y" path of step 370, the method proceeds to step 355 to tune to the next candidate carrier frequency of the RSSI list and continues until all candidate carrier frequencies are checked. If the maximum number of attempts has not been reached, "N" path of step 370, the method proceeds to step 360 to perform another attempt at the cell search to detect a synchronization signal for the current candidate carrier frequency.

If the cell search for the current candidate carrier frequency cell is successful, "Y" path of step 365, the method proceeds to step 375. At step 375 a determination is made as to whether all of the candidate carrier frequencies of the RSSI list are checked. If all of the carrier frequencies of the RSSI list are not checked, "N" path of step of 375, the method returns to step 355 to tune to the next candidate carrier frequency in the RSSI list and continues the method until all candidate carrier frequencies are checked. If all of the carrier frequencies of the RSSI list are checked, "Y" path of step 375, the method proceeds to step 380. Step 380 is a determination step to determine if at least one cell has been found in the RSSI list of candidate carrier frequencies. If at least one cell has not been found in the RSSI list of candidate carrier frequencies, "N" path of block 380, there are multiple possible paths. In a first path, N1, the method may return to step 350 to perform a new RSSI scan to find the top $N_f$ frequencies to scan. In a second path, N2, the UE may "time out" until an appropriate trigger initiates the scan at a subsequent time. If at least one cell has been found in the RSSI list of candidate carrier frequencies, "Y" path of block 380, the method may be completed. However, it may be possible to perform a new RSSI scan to find the top $N_f$ frequencies to scan if more than one cell is desired.

In addition, it may be possible to stop the method at any time if a particular cell is found with a strong signal.

Figure 4A:
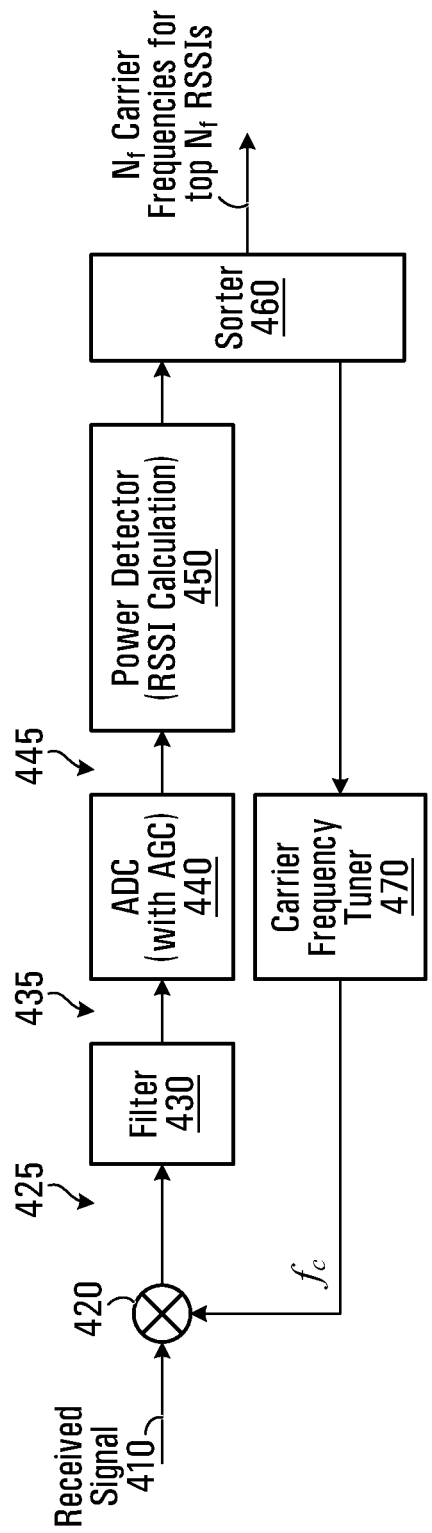
FIG. 4A is a block diagram illustrating elements involved in performing an RSSI frequency scan approach.

Referring to FIG. 4A, shown is an example of a basic implementation of components for performing an RSSI scan such as that described above with reference to FIG. 3. A received signal 410 is provided to a mixer 420, in which the received signal is mixed with a carrier frequency $f_c$ to down convert the received signal. The result of the mixed signal 425 is filtered by a narrowband filter 430 having a selected bandwidth resulting in a filtered signal 435. The filtered signal 435 is then converted to a digital signal 445 with an analog-to-digital converter (ADC) 440 having automatic gain control (AGC). The AGC may be used to boost the input signal so that a full dynamic range of the ADC can be utilized. In some embodiments the AGC gain is known and will be taken into consideration during RSSI power calculation and sorting described below. The digital signal 445 is then subject to a power measurement process performed by power detector 450 that includes an RSSI calculation of the digital signal 445. The carrier frequencies are sorted by sorter 460, as they are processed either as the RSSI values are calculated or after the RSSI scan has been completed. The carrier frequencies may be sorted based on signal strength of the RSSI calculations. Once sorted, $N_f$, wherein $N_f >= 1$ and is an implementation specific number, carrier frequencies may be selected for further processing. $N_f$ may be equal to the total number of carrier frequencies or a subset of the total number. "Sorting" the carrier frequencies may include ordering the carrier frequencies in order of a magnitude associated with the frequencies from largest RSSI value to smallest RSSI value. Once the RSSI calculation is performed for a given carrier frequency the carrier frequency is tuned using carrier frequency tuner 470 to a new candidate carrier frequency value and that new carrier frequency is applied to the mixer 420. The $N_f$ frequencies that have been selected can then be used to perform a more detailed scan for synchronization signals to enable cell selection and re-selection.

Figure 4B:
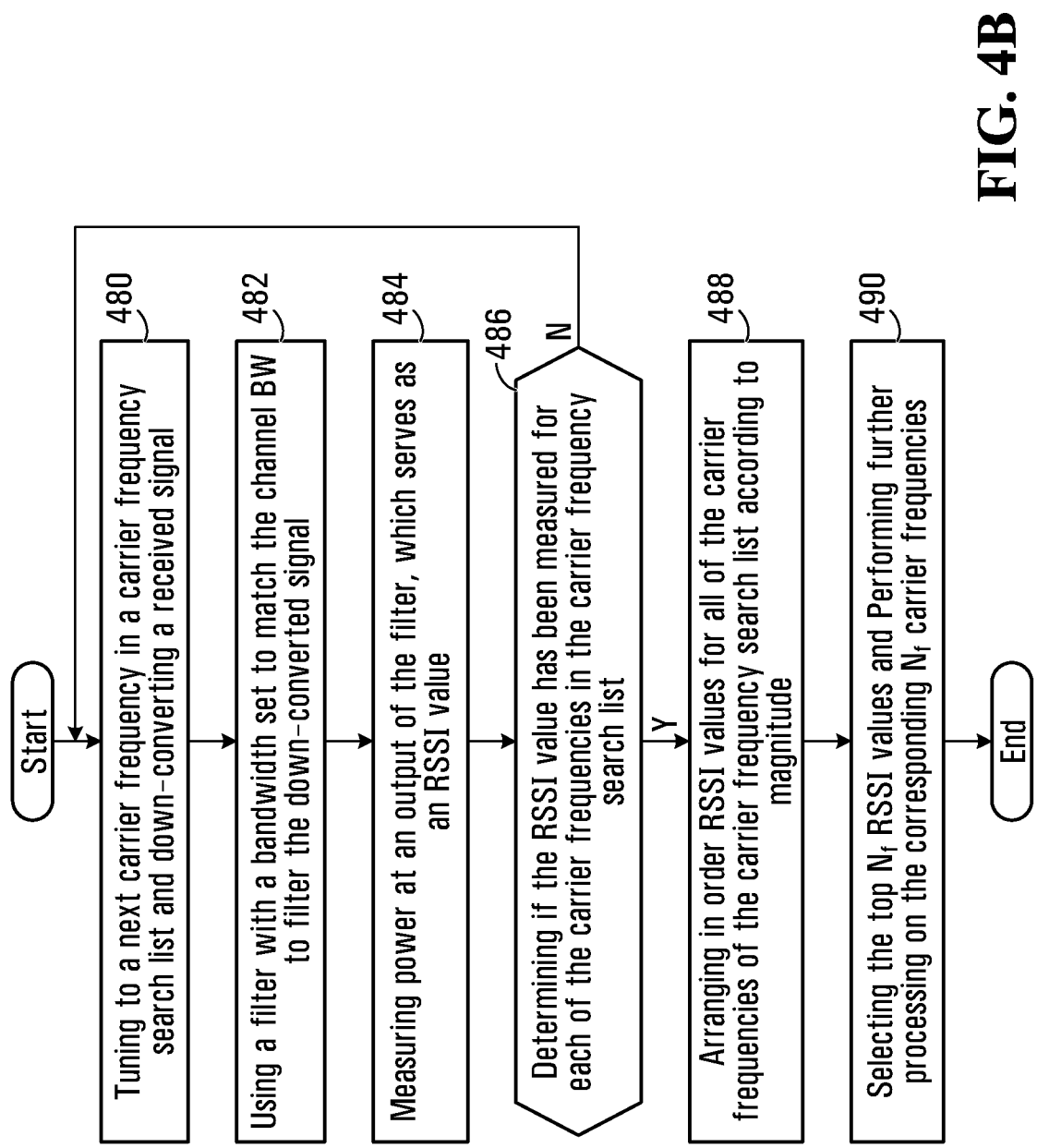
FIG. 4B is a flow chart illustrating an example method for an RSSI frequency scan approach consistent with the elements of FIG. 4A.

A full RSSI carrier frequency scan over the operating band of interest may include multiple passes. One pass of the RSSI carrier frequency scan may include steps as illustrated in the flow chart of FIG. 4B. In some embodiments, the steps of FIG. 4B provide additional detail to that described with reference to FIG. 4A. Referring to FIG. 4B, a first step 480 includes tuning to a next carrier frequency in a carrier frequency search list and down-converting a received signal. A second step 482 includes using a filter with a bandwidth set to match a particular channel bandwidth (BW) to filter the down-converted signal. A third step 484 includes measuring power at an output of the filter, which serves as an RSSI value for the particular channel bandwidth. A further step 486 includes determining if the RSSI value has been measured for each of the carrier frequencies in the carrier frequency search list. If the RSSI values for each of the carrier frequencies in the carrier frequency search list have not been measured, "N" path of step 486, then the method returns to step 480. If the RSSI values for each of the carrier frequencies in the carrier frequency search list have been measured, "Y" path of step 486, then the RSSI values for all of the carrier frequencies of the carrier frequency search list are arranged in order according to the RSSI value magnitudes at step 488. In step 490, the top $N_f$ RSSI values are selected and the corresponding $N_f$ carrier frequencies are further processed, such that a search for an E-UTRA synchronization signal is conducted at each carrier frequency of the $N_f$ frequency candidates.

One pass of the RSSI carrier frequency scan is considered to be completed once the cell search block completes the search of the E-UTRA synchronization signals for all $N_f$ frequency candidates. If no cell is found, a subsequent pass of the RSSI carrier frequency scan may be performed. In some embodiments a "sleep" time, or delay, is included between passes. In some embodiments, the delay is increased with each iteration, which may prolong battery life of the UE battery. In some embodiments in subsequent passes, the received power at each candidate carrier frequency will be re-measured and a new set of $N_f$ frequency candidates selected. Generally, the RSSI frequency scan may be considered simpler than the exhaustive scan of the synchronization signal at all possible carrier frequencies.

In some implementations, the frequency scan performance can be measured by a mean frequency scan time. For example, if (a) the frequency scan is repeated if one pass cannot detect any cell; (b) the frequency scan time needed for each pass is the same; (c) the correct detection probability for each pass, i.e., the probability that the correct EARFCN falls into the set of $N_f$ frequency candidates, is the same, the mean frequency scan time for the RSSI based frequency scan can be found to be the time for a one pass frequency scan divided by the probability of a correct detection for one pass. As a result, to reduce the mean frequency scan time, the frequency scan time should be reduced for each pass or the correct detection probability for each pass should be improved, or both.

For both initial cell selection and cell re-selection, E-UTRA UEs scan the carrier frequencies to find a suitable cell from which to access the network. An exhaustive scan for searching for the E-UTRA synchronization signals for all candidate carrier frequencies is obviously computationally expensive and time consuming. The conventional RSSI frequency scan, as described above with reference to FIG. 3, on the other hand would still be computationally expensive when performed, for example, for the six possible E-UTRA channel bandwidths described above. Two examples of the conventional RSSI frequency scan and their problems are described below.

In a first example, the filter bandwidth is set in turn to each of six possible channel bandwidths for a given carrier frequency supported by E-UTRA and then the RSSI spectral densities are compared. The RSSI spectral density could be the RSSI per resource block (RB) expressed as the RSSI divided by the configured number of RBs (NRB). The NRB is different for different E-UTRA channel bandwidths. One obvious problem is that for six possible channel bandwidths, the RSSI carrier frequency scan time is increased by six times, as the RSSI carrier frequency scan must be performed separately for each of the six channel bandwidths.

In a second example, the filter bandwidth is set to a narrow bandwidth, for example around one RB=180 kHz for E-UTRA, to measure a narrowband RSSI. After that, post processing can be done to calculate RSSI spectral density based on different possible channel bandwidths. In this way, for each candidate carrier frequency, the RSSI measurement is done once rather than six times as in the first variation.

A main problem with either method described above is that performance of the post processing to calculate the RSSI spectral density is sensitive to localized high spectral density in a bandwidth being measured, which for example can occur as a result of downlink (DL) resource allocation. This can result in the possibility that the strongest RSSI value is not captured for the correct channel bandwidth and at the correct carrier frequency. Interference and/or noise can also lead to determining an incorrect carrier frequency.

In the scenario of localized DL resource allocation, a portion of a configured channel bandwidth used for a given DL resource allocation may likely have a higher power spectral density than other portions of the configured channel bandwidth, and thus that portion may be incorrectly identified as a channel at a different carrier frequency with a narrower channel bandwidth than the actual channel.

In a conventional RSSI frequency scan, the RSSI spectral density variation may result in an incorrect carrier frequency having an associated bandwidth being ranked higher than a correct carrier frequency having a same or different bandwidth. An example RSSI spectral density variation due to the DL resource allocation is illustrated in FIG. 5. In FIG. 5, a filter response 505 for a small channel bandwidth 510 is located around carrier frequency f1. The bandwidth has a high spectral density around carrier frequency f1. The high spectral density around carrier frequency f1 may occur, for instance, because that portion of the channel bandwidth is used for localized DL resource allocation during the time of the measurement, as discussed above. In addition, FIG. 5 illustrates a filter response 515 for a larger channel bandwidth 520, located around carrier frequency f2. The filter response 515 also includes bandwidth 510 surrounding carrier frequency f1. As a result, the RSSI for bandwidth 510 centered at the carrier frequency f1 is higher than that for the bandwidth centered at the carrier frequency f2. In a set of $N_f$ carrier frequency candidates, f1 will be ranked higher than f2. In this scenario f1 is not the carrier frequency for a correct channel bandwidth and therefore it is desirable that f2 be ranked higher than f1 in the set of $N_f$ carrier frequency candidates. The background noise floor 525 is shown outside the transmission bandwidth of the RBs 520.

It should be noted that in a conventional RSSI frequency scan, higher Signal to Noise Ratio (SNR) values for different channel bandwidth hypotheses with respect to the background noise floor will not affect the likelihood of selecting the correct carrier frequency.

The present application proposes methods for performing differential RSSI frequency scans for each of a plurality of channel hypotheses, each channel hypothesis having a hypothetical occupied portion and a hypothetical guard band portion. A respective metric can be calculated based on a power value for the hypothetical occupied portion and a power value for the hypothetical guard band portion. Based on the metrics determined for the plurality of channel hypotheses, at least one channel hypothesis can be selected for further processing for cell selection or re-selection.

There are various ways of obtaining the power values for the hypothetical occupied portion and the hypothetical guard band portion. Two examples will be described in further detail below.

In the first example, the received power within frequency bins is determined across an operating band using a narrow band filter. The frequency bins collectively form the hypothetical occupied portion and hypothetical guard band portion of the hypothetical channels. For each of the channel hypotheses, an RSSI difference is calculated between the hypothetical occupied portion and the hypothetical guard band portion.

In the second example, for an operating band having a bandwidth, a wideband filter having a filter bandwidth that is equal to or less than the operating band bandwidth filters a received signal. For each filtered signal a Fast Fourier Transform (FFT) is performed and results in power values at a plurality of frequency bins with a resolution equal or less than a standard specific frequency raster. More generally, a discrete Fourier transform (DFT) is performed. In some embodiments, a bank of fixed bandwidth filters could be used such that the fixed bandwidths are equal to the size of the frequency bins and each filter determines a power for its respective bandwidth. The power values of frequency bins can then be used to determine power values for the hypothetical occupied portions and power values for the hypothetical guard band portions of the respective channel hypotheses. For each of the channel hypotheses, an RSSI difference is calculated between the hypothetical occupied portion and the hypothetical guard band portion.

These processes may improve the probability of correct detection of the carrier frequency by a UE for a cell serving a given area, which in turn may reduce the mean frequency scan time in both initial cell selection and cell re-selection. This may ultimately lead to battery power savings for the UE.

In some embodiments a differential RSSI frequency scan that is described above, and in further detail below, is less vulnerable to RSSI spectral density variation due to the use of the RSSI difference calculation. As an explanation, consider the situation described with reference to FIG. 5 where RSSI spectral density for a narrow bandwidth is higher than RSSI spectral density for a wider bandwidth, even though the wider bandwidth may be centered on the carrier frequency and correspond to the transmission bandwidth associated with an operable telecommunications cell.

Referring to FIG. 6, which illustrates a similar scenario as FIG. 5, that includes a bandwidth BW1 510 around carrier frequency f1 having a larger RSSI spectral density than a bandwidth BW2 520 around carrier frequency f2, it can be seen how a localized power spectral variation may render the RSSI spectral density measured for the small bandwidth BW1 510 centered at the carrier frequency f1 higher than that measured for the wider channel bandwidth BW2 520 centered at the carrier frequency f2. Here, BW2 is greater than BW1 and the RSSI spectral density for BW1 510 is slightly higher than that for BW2 520.

As discussed above, as the UE may not have information about which carrier frequencies are used by cells in a given operating band, the UE assumes all carrier frequencies with a standard specific frequency spacing are candidate carrier frequencies that may be utilized by a cell. Furthermore, the UE does not know a priori which one of multiple possible bandwidths is associated with a cell carrier frequency. In some embodiments, the UE generates multiple channel hypotheses for each candidate carrier frequency. In E-UTRA, the set of possible channel bandwidths depends on the particular operating band.

In some embodiments, a UE may support multiple operating bands and generally scans at least one of them.

In some embodiments, a UE may support other radio access technologies (RATs) that use the same or overlapping operating bands as the RAT being searched for. The UE may include the possible bandwidths of other RATs in the set of multiple channel hypotheses.

For the particular example of FIG. 6, a first hypothesis is that there is a hypothetical channel with hypothetical transmission bandwidth BW1 centred at carrier frequency f1, with a hypothetical guard band on the left side, or lower frequency side, of BW1 and a hypothetical guard band on the right side, or higher frequency side of BW1. To test this hypothesis, the power spectral density of the transmission bandwidth BW1 is compared with the power spectral density of one or more of the guard bands of BW1 to determine a difference. The power spectral density is a power normalized according to the bandwidth or a number of frequency bins over which the power was measured.

A second hypothesis is that there is a hypothetical channel with hypothetical transmission bandwidth BW2 centred at carrier frequency f2, with a hypothetical left guard band BW2 and hypothetical right guard band of BW2. To test this hypothesis, the power spectral density of the transmission bandwidth BW2 is compared with the power spectral density of one or more of the guard bands of BW2 to determine a difference.

If only the two hypotheses described above were tested, then processing of the channel hypotheses can proceed as described below.

Of course, in reality, there may be many more hypotheses that are tested, that would include other center frequencies and other channel bandwidths. In some embodiments multiple channel hypotheses, for example each channel hypothesis having a different hypothetical channel bandwidth, are tested for each candidate carrier frequency. In some embodiments, for each candidate carrier frequency a single channel hypothesis having an associated bandwidth, is selected which has a largest differential RSSI power value. $N_f$ candidate carrier frequencies with the largest differential RSSI power values are selected from all of the candidate carrier frequencies for further processing. In some embodiments, more than one channel hypothesis, each having a different associated transmission bandwidth, may be selected at each candidate carrier frequency for further processing.

Referring again to FIG. 6, the channel that corresponds to the hypothetical channel having transmission bandwidth BW2 centered at carrier frequency f2 is intended to be an actual channel used by a cell and the signal within the channel is strong enough so that guard band power contributed by background noise and interference is lower than the RSSI spectral density for BW2. The power difference 620 between the RSSI spectral density of the hypothetical channel having transmission bandwidth BW2 and the background noise floor power 610 is larger than the power difference 630 between the RSSI spectral density for the hypothetical channel having transmission bandwidth BW1 and that for the hypothetical channel having transmission bandwidth BW2.

With a conventional RSSI frequency scan, as the RSSI spectral density for the channel hypothesis having transmission bandwidth BW1 is higher than that for the channel hypothesis having transmission bandwidth BW2, f1 will be ranked higher than f2 in a set of the top $N_f$ carrier frequency candidates having the strongest RSSI values, even though the channel hypothesis having the transmission bandwidth BW2 and carrier frequency f2 corresponds to the actual telecommunications cell. With the differential RSSI frequency scan, however, as the power difference 620 between the RSSI spectral density for the channel hypothesis having transmission bandwidth BW2 and the background noise floor power 610 is larger than the power difference 630 between the RSSI spectral density for the channel hypothesis having transmission bandwidth BW1 and that for the channel hypothesis having transmission bandwidth BW2, f1 will be ranked lower than f2 in the top $N_f$ frequency candidates.

It is noteworthy to mention that unlike in the conventional RSSI frequency scan case discussed above, an increased SNR can increase the difference between the RSSI spectral density for BW2 and the noise floor and thus further improve the performance of the differential RSSI frequency scan.

In some embodiments the RSSI difference is the difference in power spectral density between the hypothetical occupied portion and the hypothetical guard band portion for a particular channel hypothesis. Here, a power spectral density is a measured power divided by the number of frequency bins over which the power was measured. The RSSI difference at carrier frequency $f_k$ for a channel hypothesis $B_m$ is determined as follows:

$$RSSI_{diff}(f_k, B_m) = \frac{P_{occupiedband}(f_k, B_m)}{N_{occupiedband}(f_k, B_m)}(\text{dB}) - \frac{P_{guardband}(f_k, B_m)}{N_{guardband}(f_k, B_m)}(\text{dB}). \quad (1)$$

$P_{occupiedband}(f_k, B_m)$ is the power measured within the hypothetical occupied portion. $P_{guardband}(f_k, B_m)$ is the power measured within the hypothetical guard band portion. $N_{occupiedband}(f_k, B_m)$ and $N_{guardband}(f_k, B_m)$ are the numbers of frequency bins used in the power measurements in the hypothetical occupied portion and the hypothetical guard band portion, respectively. Here, the guard band portion includes both the left guard band and the right guard band, if the power measurements for those two guard bands are available.

The RSSI difference for a given channel hypothesis when calculated in logarithmic (decibel, dB) scale is equivalent to the power ratio between the power spectral density in the occupied portion and the power spectral density in the guard band portion. In some embodiments, the RSSI difference is calculated using a linear scale.

For a particular case of E-UTRA, the bandwidths that may be used for different channel hypotheses include BW=1.4 MHz, 3 MHz, 5 MHz, 10 MHz, 15 MHz, 20 MHz. In a particular implementation, the bandwidth of the occupied portion=transmission bandwidth configuration=NRB*12*0.015 MHz as tabulated in Table 1. More generally, the possible channel bandwidths, the number of subcarriers and the subcarrier frequency spacing are implementation specific, for example specific to a particular standard. Examples of the occupied portion and the guard band portion for E-UTRA channel bandwidth hypotheses are illustrated in FIG. 7.

Figure 7:
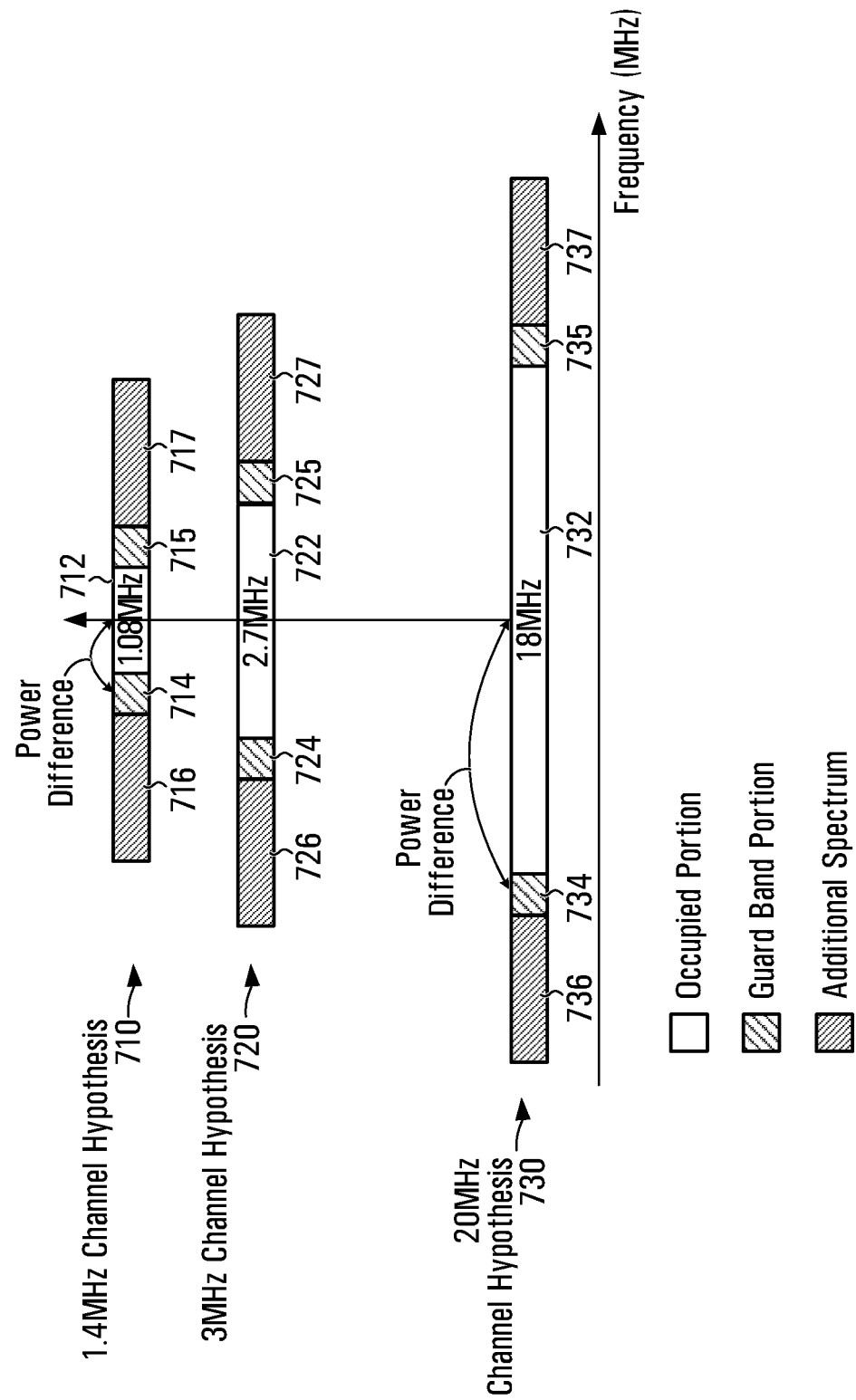
FIG. 7 is a schematic diagram illustrating the occupied band and guard band for several E-UTRA channel bandwidth hypotheses.

Referring to FIG. 7, shown are several different channel hypotheses including a 1.4 MHz channel hypothesis, a 3 MHz channel hypothesis and a 20 MHz channel hypothesis. The 1.4 MHz channel hypothesis shows a bandwidth 710 of 1.4 MHz, but the maximum occupied portion 712 is only 1.08 MHz. The guard band portions, upper 715 and lower 714, together collectively form the remainder 0.32 MHz of the 1.4 MHz bandwidth. Outside the 1.4 MHz bandwidth is additional spectrum 716,717 for other channels, unused spectrum, or spectrum reserved for other purposes. The power difference for the 1.4 MHz channel hypothesis is determined between the occupied portion 712 and the guard band portions 714,715. The 3 MHz channel hypothesis shows a bandwidth 720 of 3 MHz, but the occupied portion 722 is only 2.7 MHz. The guard band portions, upper 725 and lower 724, together collectively form the remainder 0.3 MHz of the 3 MHz bandwidth. Outside the 3 MHz bandwidth is additional spectrum 726,727 for other channels, unused spectrum, or spectrum reserved for other purposes. The power difference of the 3 MHz channel hypothesis is determined between the occupied portion 722 and the guard band portions 724,725. The 20 MHz channel hypothesis shows a bandwidth 730 of 20 MHz, but the occupied portion 732 is only 18 MHz. The guard band portions, upper 735 and lower 734, together collectively form the remainder 2 MHz of the 20 MHz bandwidth. Outside the 20 MHz bandwidth is additional spectrum 736,737 for other channels, unused spectrum, or spectrum reserved for other purposes. The power difference of the 20 MHz channel hypothesis is determined between the occupied portion 732 and the guard band portions 734,735.

In some embodiments, during the RSSI scan, at each candidate carrier frequency for which channel hypotheses are being determined, the RSSI difference at carrier frequency $f_k$ is given by:

$$RSSI_{diff}(f_k) = \max_{B_m} \{RSSI_{diff}(f_k, B_m)\}. \qquad (2)$$

In equation (2), the $RSSI_{diff}(f_k)$ value is the maximum difference value of all of the channel hypotheses, i.e., of all possible $B_m$ values, that were determined for that candidate carrier frequency. When $RSSI_{diff}(f_k)$ is determined, the corresponding channel bandwidth $B_m$, which gives the largest $RSSI_{diff}(f_k, B_m)$, is also the most likely channel bandwidth used at that candidate carrier frequency.

In some embodiments, if at a candidate carrier frequency, the difference between the top two $RSSI_{diff}(f_k, B_m)$ for two different hypothetical channel bandwidths is less than a threshold, it is possible to keep more than one hypothetical channel bandwidth for that candidate carrier frequency.

In LTE, downlink synchronization signals are transmitted within the center 1.4 MHz of a given center carrier frequency. That means that a UE does not need to know particular channel bandwidth information to detect an LTE sync signal. Once a cell is found, the UE can read broadcast system information to determine the channel bandwidth being used. Therefore, in some embodiments when a synchronization signal is detected, the detected channel bandwidth information is not necessarily passed on as part of further processing of the detected candidate carrier frequency.

In the particular implementation of E-UTRA as described above, the $RSSI_{diff}$ value may be the maximum difference value calculated for channel hypotheses having bandwidths equal to 1.4 MHz, 3 MHz, 5 MHz, 10 MHz and 20 MHz or the subset of these channel bandwidths applicable to the operating band being scanned.

Normally, different E-UTRA carriers are separated in frequency based on their channel bandwidths as shown in the example of FIG. 2. The nominal channel spacing between two adjacent E-UTRA carriers is (BW1+BW2)/2, where BW1 and BW2 are their respective channel bandwidths. As such, the upper or lower guard bandwidth could be set to half of the difference between the channel bandwidth in MHz and the transmission bandwidth in MHz (see Table 1).

In some deployments the E-UTRA channel spacing may be reduced slightly in order to maximize use of spectrum allocations. This results in an overlap of the guard bands of adjacent channels. In extreme cases, the effective combined guard band between channels may be less than the nominal one-sided guard band. To accommodate such a scenario, the guard band portion used in the metric may be configured to be narrower than the nominal guard band width. In some embodiments, a UE may read broadcast information from the cell on which the UE has camped (the cell by which the UE is accessing the network) to acquire the carrier frequencies of neighbour cells, from which the UE may estimate the frequency location of guard band portions between two adjacent inter-frequency cells and may use the estimated frequency locations of guard band portions in a future differential RSSI scan.

An uncompensated frequency offset at the UE could result in some of the power from the actual occupied portion spilling into the hypothetical guard band portion on one side, thus reducing the measured power difference and the quality of the metric. To mitigate this, in some embodiments the start of each guard band portion may be adjusted by moving it away from the nominal transmission band edge by a margin corresponding to the maximum expected frequency offset.

The RSSI difference frequency scan, which may also be referred to in this application as the differential carrier frequency scan, can be performed in a manner similar to that in the conventional RSSI frequency scan, but with a narrowband filter and an extra processing block for performing an RSSI difference calculation. This is illustrated in FIG. 8.

Figure 8:
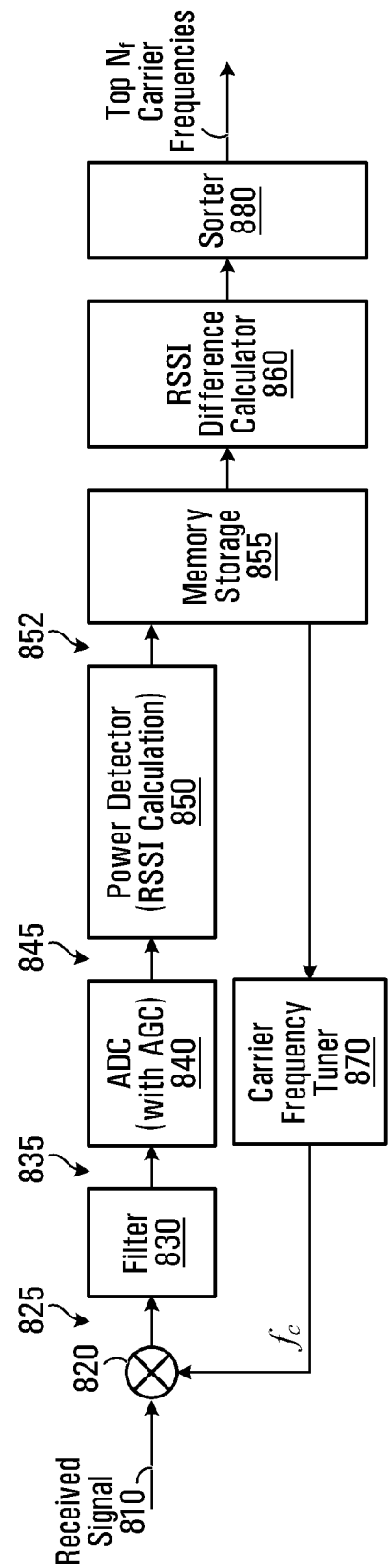
FIG. 8 is a block diagram illustrating elements involved in performing an RSSI frequency scan approach using a narrowband filter according to some embodiments of the application.

Referring to FIG. 8, shown is an example of a basic implementation of components for performing an RSSI difference scan according to embodiments of the application. A received signal 810 is provided to a mixer 820, in which the received signal is mixed with a carrier frequency $f_c$ to downconvert the received signal. The result of the mixed signal 825 is filtered by a narrowband filter 830 resulting in a filtered signal 835. In some embodiments, the narrowband filter 830 has a bandwidth designed to filter a portion of an operating band, such that multiple portions of the operating band are used to determine the power spectral density of an occupied portion of bandwidth and a guard band portion of bandwidth for a channel hypothesis to be tested. In some embodiments the narrowband filter has a filter bandwidth designed to filter a single frequency bin and multiple such measurements are used to obtain an appropriate measurement for the hypothetical occupied portion of the bandwidth and the hypothetical guard band portion of the bandwidth for a channel hypothesis. The filtered signal 835 is then converted to a digital signal 845 with an ADC module 840 incorporating AGC. The digital signal 845 is then subject to a power measurement process by a power detector 850 that includes an RSSI calculation of the digital signal. A result of the RSSI calculation 852 can then be stored in memory store 855. Once the power measurement for a given carrier frequency is performed, the carrier frequency is tuned to a new candidate carrier frequency by carrier frequency tuner 870 and that new candidate carrier frequency $f_c$ is applied to the mixer 820. When sufficient measurements have been made over multiple frequency bins for the occupied portion of a given channel hypothesis and the guard band portion of the given channel hypothesis, the power measurements are then used by an RSSI difference calculator 860 to calculate an RSSI difference between the hypothetical occupied portion and the hypothetical guard band portion for the given channel hypothesis. The RSSI difference may be determined when sufficient measurements have been made for the given channel hypothesis or when all of the candidate carrier frequencies within an operating band have been measured. Once all the candidate carrier frequencies have had the RSSI difference calculated, the candidate carrier frequencies are sorted 880, such that $N_f$, wherein $N_f>=1$ and is an implementation specific number, candidate carrier frequencies associated with respective channel hypotheses are selected for use in further processing related to cell selection and re-selection. Alternatively, the candidate carrier frequencies can be sorted as they are determined.

In some embodiments, the $N_f$ candidate carrier frequencies can then be used to perform a more detailed scan to enable cell selection and re-selection. In some embodiments, a UE may stop evaluating candidates early if the RSSI difference exceeds a threshold, indicating a strong possibility that this is an operational carrier frequency, and proceed directly to searching for synchronization signals on it.

In some implementations the narrowband filter has a bandwidth equal to one frequency bin, wherein the frequency bin includes one or more subcarriers. Each channel hypothesis includes a bandwidth having a hypothetical occupied portion and a hypothetical guard band portion, wherein the hypothetical occupied portion and a hypothetical guard band portion are each collectively formed of multiple frequency bins.

In a particular example, the filter is a narrowband analog filter with bandwidth=100 kHz (double sided) so a relatively low sampling rate can be used in the ADC. In some implementations a wide-band analog filter and a high sampling rate ADC, followed by a tunable narrow-band digital filter or filter bank can be used to extract the power at frequency bins of interest.

A power measurement may be performed after settling of the AGC and be obtained by averaging the received samples over a time duration for which the measured power does not depend significantly on the precise start time.

The power average for frequency bin $f_k$ having a candidate carrier frequency for a current pass is $$P(f_k)=\text{average}(x_n x_n^*) \quad (3)$$

where $x_n$ is the n-th data sample within the measurement subframes of the digital signal for the given candidate carrier frequency and $x_n^*$ is the complex conjugate of $x_n$.

In some embodiments, a UE may be equipped with multiple receive antennas. The UE may evaluate the power average in (3) for each receive antenna, calculate the sum of the power averages over multiple receive antennas, and use that power sum as a measured power for the current pass.

Power from at least one receive antenna and from one pass may be averaged over multiple passes as well if desirable. This can be implemented, for example, by an Infinite Impulse Response (IIR) filter.

In the case of such an IIR filter, the averaged power after m passes, where m≥1 is given by $$\overline{P}_m(f_k)=(1-\alpha)\overline{P}_{m-1}(f_k)+\alpha P(f_k) \quad (4)$$

where $0<\alpha\leq 1$ is a weighting factor, $\overline{P}_m(f_k)$ is the average after m passes, $P(f_k)$ is the power value of the current pass, and $\overline{P}(f_k)$ is initialized to the power value of the first pass.

Figure 9:
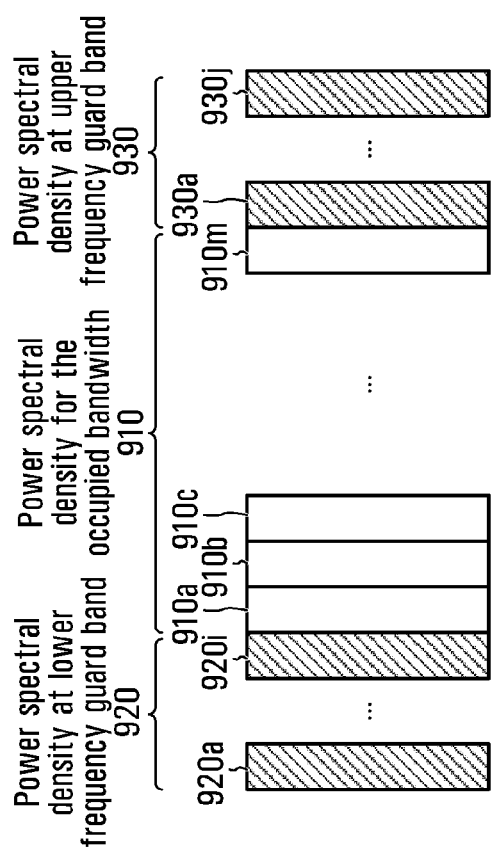
FIG. 9 is a schematic diagram illustrating the occupied band and guard band powers in particular frequency bins of the channel bandwidth.

FIG. 9 is an example showing how the power spectral density expressed in the power per frequency bin in a hypothetical occupied portion 910 is determined based on the power of each frequency bin 910a,910b,910c, ... 910m in the hypothetical occupied portion 910 and how the power spectral density in the hypothetical guard band portion (including the lower frequency hypothetical guard band portion 920 and the upper frequency hypothetical guard band portion 930, if applicable) is determined based on the power of each frequency bin 920a, ... 920i and 930a, ... 930j in the hypothetical guard band portions 920,930.

In some embodiments, in determining the power spectral density there may be a processing delay in the RSSI difference calculation as before the calculation is performed it may be necessary to wait for the powers of all of the frequency bins of interest to be measured.

For a particular implementation in an E-UTRA operating band, the candidate carrier frequencies to be scanned are integer multiples of 100 kHz from the lower band edge plus half of ChBwSmall (MHz) to the higher band edge minus half of ChBwSmall (MHz). Here, ChBwSmall is the smallest channel bandwidth that can be used in the given E-UTRA operating band. The RSSI is measured across all EARFCNs including the guard bands for all hypothesized channel bandwidths. In some embodiments, the candidate carrier frequencies to be scanned between the lower and upper band edges are integer multiples of an implementation specific frequency raster.

In some embodiments, a narrowband filter having a bandwidth higher than 100 kHz is used in the RSSI difference scan. For example, the narrowband filter bandwidth could be as large as the guard bandwidth for the respective channel, or otherwise stated, a frequency bin could be as large as the guard bandwidth. Therefore the narrowband filter bandwidth could be $NBF_{BW}$=Channel bandwidth minus Transmission bandwidth, where examples of Channel bandwidth and Transmission bandwidth can be found in Table 1. The power spectral density for the hypothetical occupied portion can be calculated by averaging power measurements for several frequency bins as long as the corresponding frequency bins fall within the hypothetical occupied band.

According to the second approach discussed briefly above, the differential RSSI frequency scan can be performed using a wideband filter to cover a wide range of the spectrum and then employ Fourier transform processing, for example FFT or DFT, to analyze the power spectrum. This is illustrated in FIG. 10.

Figure 10:
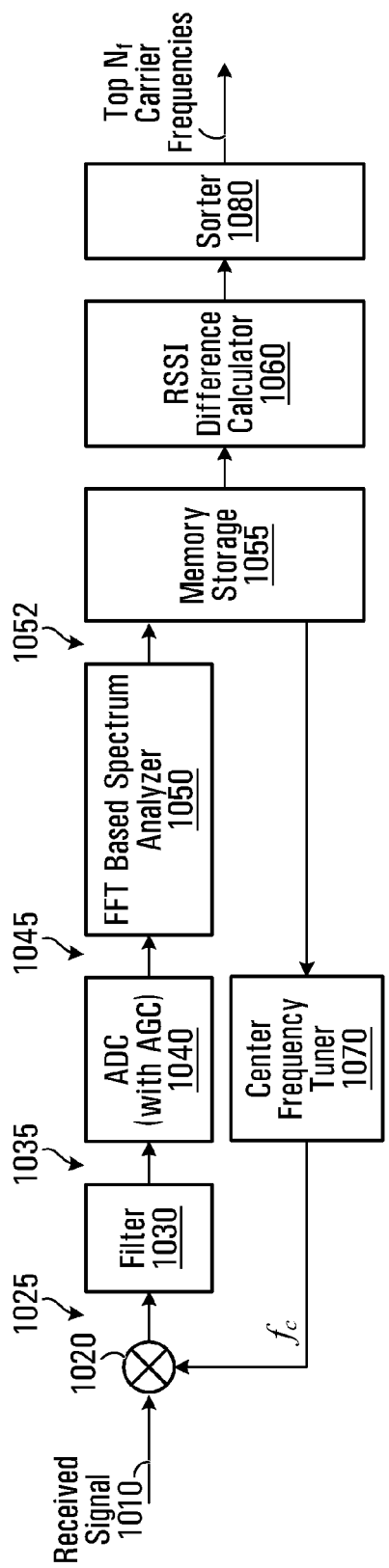
FIG. 10 is a block diagram illustrating elements involved in performing an RSSI frequency scan approach using a wideband filter and Fast Fourier Transform (FFT) according to some embodiments of the application.

Referring to FIG. 10, shown is an example of a basic implementation of components for performing an RSSI difference scan according to embodiments of the application. A received signal 1010 is provided to a mixer 1020 with a center frequency $f_c$. The result of the mixed signal 1025 is filtered by a filter 1030. The bandwidth of the filter 1030 may be equal to the operating band or a portion thereof. When the bandwidth is a portion of the operating band, multiple filtering operations of the operating band can be performed by down converting the received signal with an appropriate center frequency applied to the mixer 1020. For a given filtered signal 1035, the filtered signal 1035 is then converted to a digital signal 1045 with an ADC 1040 incorporating AGC. The digital signal 1045 is applied to a fast Fourier transform (FFT) based spectrum analyzer 1050 that generates a power spectrum 1052 of the digital signal with a given frequency bin resolution. The power values for frequency bins of the power spectrum 1052 generated by the FFT based spectrum analyzer 1050 can then be stored in memory storage 1055. Once the power spectrum 1052 is measured for a given center frequency associated with the filtered signal 1035, the center frequency is tuned to a new center frequency value by the center frequency tuner 1070 and that new center frequency is applied to the mixer 1020. Once all the frequency bins for the operating band have been measured, hypothetical occupied portions and hypothetical guard band portions can be determined for each channel hypothesis for one or more candidate carrier frequencies associated with respective channel hypotheses. The candidate carrier frequencies in the operating band have a much closer spacing than the center frequencies used when down converting and filtering the received signal with the wideband filter. When sufficient determinations have been made for the hypothetical occupied portion of a given channel hypothesis and the hypothetical guard band portion of a given channel hypothesis, resulting power measurements are then used by the RSSI difference calculator 1060 to calculate an RSSI difference between the hypothetical operating band and the hypothetical guard band for one or more channel hypotheses. Once all the carrier frequencies have had the RSSI difference calculated, the carrier frequencies are sorted by sorter 1080 such that $N_f$, wherein $N_f>=1$ and is an implementation specific number, carrier frequencies are selected. Alternatively, the carrier frequencies can be sorted as they are determined. In some embodiments, the $N_f$ frequencies can then be used to perform a more detailed scan including a search for synchronization signals to enable cell selection and re-selection.

A device capable of performing a Fourier transform, such as the FFT based spectrum analyzer, may be used to calculate an auto-correlation result of data samples and perform an FFT. In some embodiments, calculating the auto-correlation result and performing the FFT is done after settling of the AGC by processing the received samples over a suitable time window.

The auto-correlation can be determined by:

$$R(r) = \text{average}(x_n x_{n+r}^*), \quad (5)$$

for $r = -N/2, -N/2+1, \ldots, 0, 1, \ldots, N/2-1$
where r is a sample offset, N is the length for an auto-correlation vector and N is selected such that the frequency bin spacing in the frequency domain defined by a sampling frequency ($f_s$) divided by N, i.e., $f_s/N$, is equal to a desired spacing. For example, in some implementations $f_s/N$ is equal to or less than 100 kHz.

In some embodiments the frequency bin spacing in the FFT based spectrum analyzer can be set smaller than 100 kHz. For example, it is possible to use 15 kHz, which is the E-UTRA subcarrier spacing. In some embodiments, the carrier frequency spacing of 100 kHz could be approximated by offsetting by 6 or 7 bins of 15 kHz the accumulation windows used to determine the occupied portion and guard band portions.

Using an FFT based spectrum analyzer and the smaller frequency bins (15 kHz) it is possible to weight the frequency bins corresponding to the subcarriers that carry a downlink cell-specific reference signal for the RSSI difference calculation as the reference signals are broadcast within the configured transmission band on a regular basis, except as discussed above in certain TDD or MBSFN subframes.

For E-UTRA, for a given cell, there are two downlink cell-specific RS patterns and they are subcarrier shifted with respect to each other. In E-UTRA, a UE in the cell search stage does not know the cell ID which dictates the offset of the RS pattern and may need to consider all possible offsets. For different cells, the RS patterns in one cell may be shifted by one subcarrier with respect to the RS patterns in another cell. Within one E-UTRA subframe, RS patterns are alternatively used by the OFDM symbols selected to carry the RSs. For each RS pattern, there is generally one RS subcarrier every 6 subcarriers except that there is an additional one subcarrier spacing between the two RS subcarriers around the central DC subcarrier. Based on the RS patterns discussed above, the RS frequency bins could be assigned to a higher weight. The weight is within [0,1]. If there is no carrier frequency offset between the base station and a wireless device, the weight can be set to 1 for the RS frequency bins and 0 for others. Since the carrier frequency offset is unknown at the time of initial cell search and normally not equal to zero, a general weight factor is used here. RS frequency bins may for example be one every three subcarriers across the configured transmission band.

The power spectrum for a current pass can be determined as:

$$\phi(k) = \text{FFT}[R(r)], \quad (6)$$

$k = -N/2, -N/2+1, \ldots, 0, 1, \ldots, N/2-1$
wherein $R(r)$ is defined in equation (5) above. For $\phi(k)$, its corresponding carrier frequency is $f_c + k \cdot f_s/N$, where $f_c$ is the current carrier frequency applied to the mixer 1020 in FIG. 10 and the frequency bin spacing is $f_s/N$ as mentioned in equation (5). A windowing function $W_f(r)$, where $W_f(r)$ is within (0,1], may be applied on $R(r)$ so that $$\phi(k) = \text{FFT}[W_f(r) \cdot R(r)]$$

In some embodiments, a UE may be equipped with multiple receive antennas. The UE may evaluate the power spectrum as in equation (6) above for each receive antenna, calculate the sum of the power spectrum over multiple receive antennas, and use that power spectrum sum as a measured power spectrum $\phi(k)$ for the current pass.

An average over multiple (m) passes can be determined as:

$$\bar{\phi}_m(f_k) = (1-\alpha)\bar{\phi}_{m-1}(f_k) + \alpha\hat{\phi}(f_k) \quad (7)$$

where $0 < \alpha \leq 1$ is a weighting factor, $\bar{\phi}_m(f_k)$ is an average after m passes, $\hat{\phi}(f_k)$ is a power spectrum value of the current pass, and $\bar{\phi}_0(f_k)$ is initialized to the power spectrum value of the first pass. Here, $\hat{\phi}(f_k)$ is set to the measured power spectrum $\phi(k_{closest})$ where $k_{closest}$ is an integer whose corresponding carrier frequency $f_c + k \cdot f_s/N$ is the closest carrier frequency to the carrier frequency candidate $f_k$.

In some embodiments the RSSI difference calculation that is performed for a wideband filter and Fourier transform processing is the same as that in a differential RSSI scan with a narrowband filter except that the power measurements that are used for the calculations are from the output of a power spectrum analyzer.

In some embodiments the bandwidth for the wideband filter covers the whole E-UTRA operating band provided the sampling rate can be set to at least twice the filter bandwidth.

Figure 11:
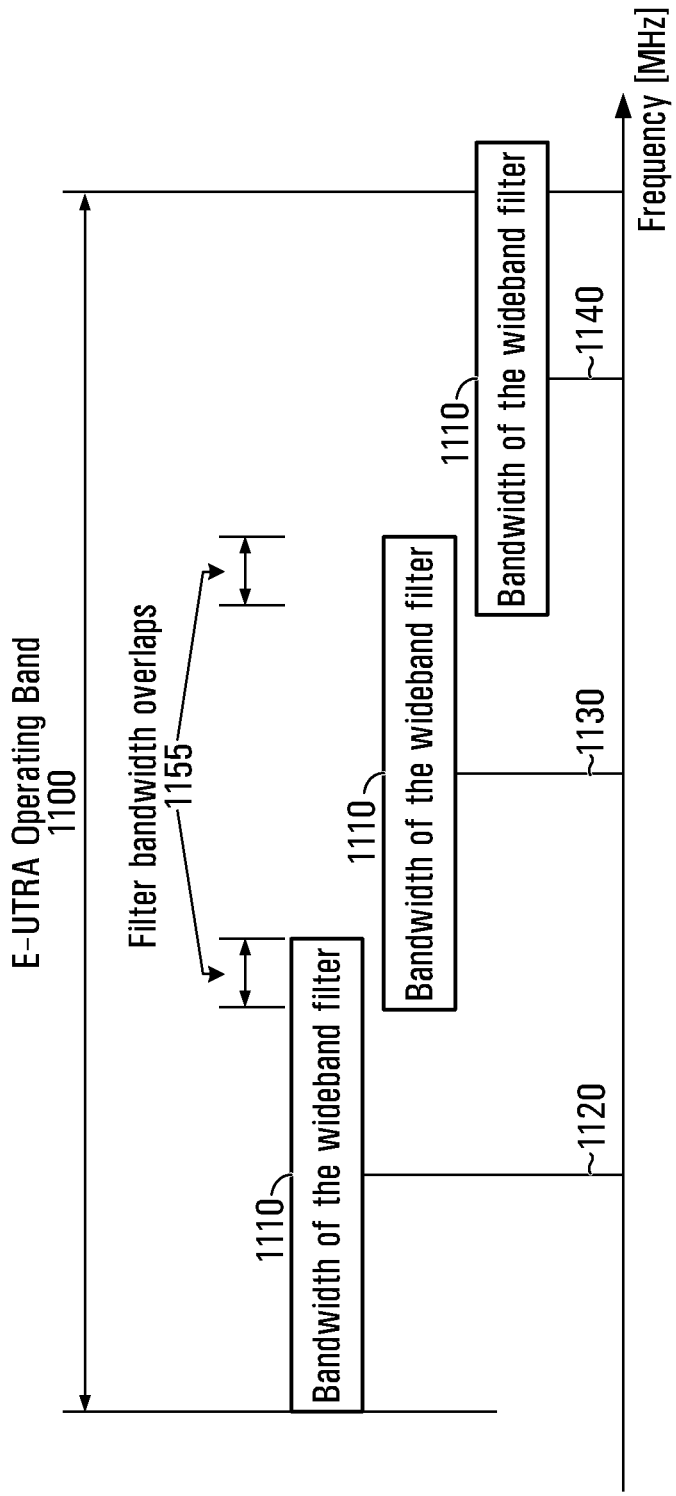
FIG. 11 is a schematic diagram of multiple wideband filter ranges utilized in performing a differential RSSI carrier frequency scan for an E-UTRA operating band.

In some implementations the number of the carrier frequencies that are scanned depends on the bandwidth of a wideband filter (BWfilter) and the bandwidth of an operating band (BWoperating). In some implementations the number of the carrier frequencies is set to a smallest integer value that is larger than the ratio of BWoperating/BWfilter. In some embodiments overlapping of filter bandwidth for the wideband filter may occur. FIG. 11 illustrates an example in which the selected bandwidth 1110 of a wideband filter results in three distinct bandwidths having respective center frequencies 1120,1130,1140 in a particular E-UTRA operating band 1100. Filter bandwidth overlap occurs as indicated by reference character 1155.

In some embodiments a power difference calculation without any normalization can be used. For example $$\text{RSSI}_{dif}(f_k, B_m) = P_{occupiedband}(f_k, B_m)(\text{dB}) - P_{guardband}(f_k, B_m)(\text{dB}) \quad (8)$$

where $P_{occupiedband}(f_k, B_m)$ is the power measured within the hypothetical occupied portion and $P_{guardband}(f_k, B_m)$ is the power measured within the hypothetical guard band portion.

The power difference for a given channel hypothesis when calculated in dB scale is equivalent to the power ratio between the power spectral density in the hypothetical occupied band and the power spectral density in the hypothetical guard band. In some embodiments, the power difference can be calculated using a linear scale.

There are multiple different metrics that can be used to represent the power difference between the hypothetical occupied band and the hypothetical guard band. For example, the metric can be in units of dB or a linear scale and can be either normalized based on the number of frequency bins in each respective occupied portion or guard band portion or without normalization.

As compared with the exhaustive scan described above, the differential RSSI frequency scan is much simpler and requires less processing power and less search time, which can lead to the UE battery power saving.

The narrowband filter based RSSI difference scan may have a shorter frequency scan time than either of the conventional RSSI scan and the exhaustive scan.

As compared with the conventional RSSI frequency scan described above in which the filter size is equal to a particular hypothetical channel bandwidth, and therefore multiple filters would be required for channel hypotheses with different bandwidths, the RSSI difference scan of the present application can be shown less susceptible to RSSI variation due to localized high spectral density variation or the effect of interference/noise. Consequently, the correct detection probability of the RSSI difference scan is much higher than that of the conventional RSSI frequency scan. This can reduce the mean frequency scan time and reduce the UE battery power consumption. It is noteworthy to mention that as the signal to noise ratio of the received signal increases, the performance of the RSSI difference scan may be improved while the performance of the conventional RSSI scan is still limited by the consequence of the localized DL resource allocation as discussed above.

Comparing the RSSI difference scan scheme of the present application with the conventional RSSI scan scheme discussed above in which a narrow band filter is used to measure power in each of multiple frequency bins and those measurements are used to determine power spectral densities for hypothetical occupied portions and hypothetical guard band portions of respective channel hypotheses, it can be determined that both schemes have similar frequency scan time. The advantage of the RSSI difference scan is potentially improved detection performance, as explained above for example with reference to FIG. 6.

Comparing the two examples of RSSI difference scan schemes described here, i.e. narrowband filter and wideband filter together with FFT, it can be determined that the time needed by the wideband filter together with FFT based RSSI difference scan is less than the time needed by the narrowband filter based RSSI difference scan as the former does not need to tune the analog section to each of the carrier frequencies covered by the wideband filter. However, the computational complexity performed by a digital module to analyze the FFT power spectrum in the wideband filter based RSSI difference scan may be higher than that in the narrowband filter based RSSI difference scan.

In the preceding portions of the application reference is made to RSSI measurements and RSSI scans. It is to be understood that RSSI can be generalized to a power measurement or power spectral density measurement of a received signal.

Figure 12:
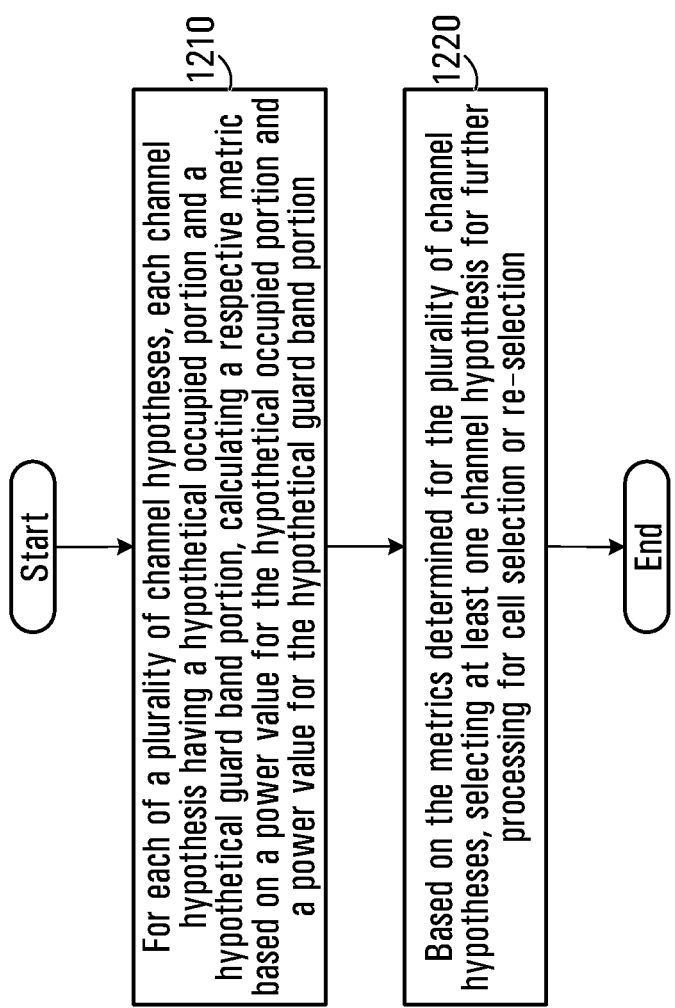
FIG. 12 is a flow chart illustrating a method according to an embodiment of the application.

Referring now to FIG. 12, a general method will be described for aiding in telecommunication cell selection and re-selection in an operating band having a plurality of channels. A first step 1210 involves, for each of a plurality of channel hypotheses, each channel hypothesis having a hypothetical occupied portion and a hypothetical guard band portion, calculating a respective metric based on a power value for the hypothetical occupied portion and a power value for the hypothetical guard band portion. A second step 1220 involves, based on the metrics determined for the plurality of channel hypotheses, selecting at least one channel hypothesis for further processing for cell selection or re-selection. In some embodiments, a UE may select several channel candidates and sort them so that the strongest candidate will be processed first in a further processing for cell selection or re-selection.

In some embodiments, selecting at least one channel hypothesis for further processing involves using information regarding the channel hypothesis, such as the associated bandwidth and carrier frequency to perform at least one of detecting a reference signal within a bandwidth defining the channel hypothesis; detecting a synchronization signal within a bandwidth defining the channel hypothesis; and identifying a cell operating within a bandwidth defining the channel hypothesis.

Figure 13:
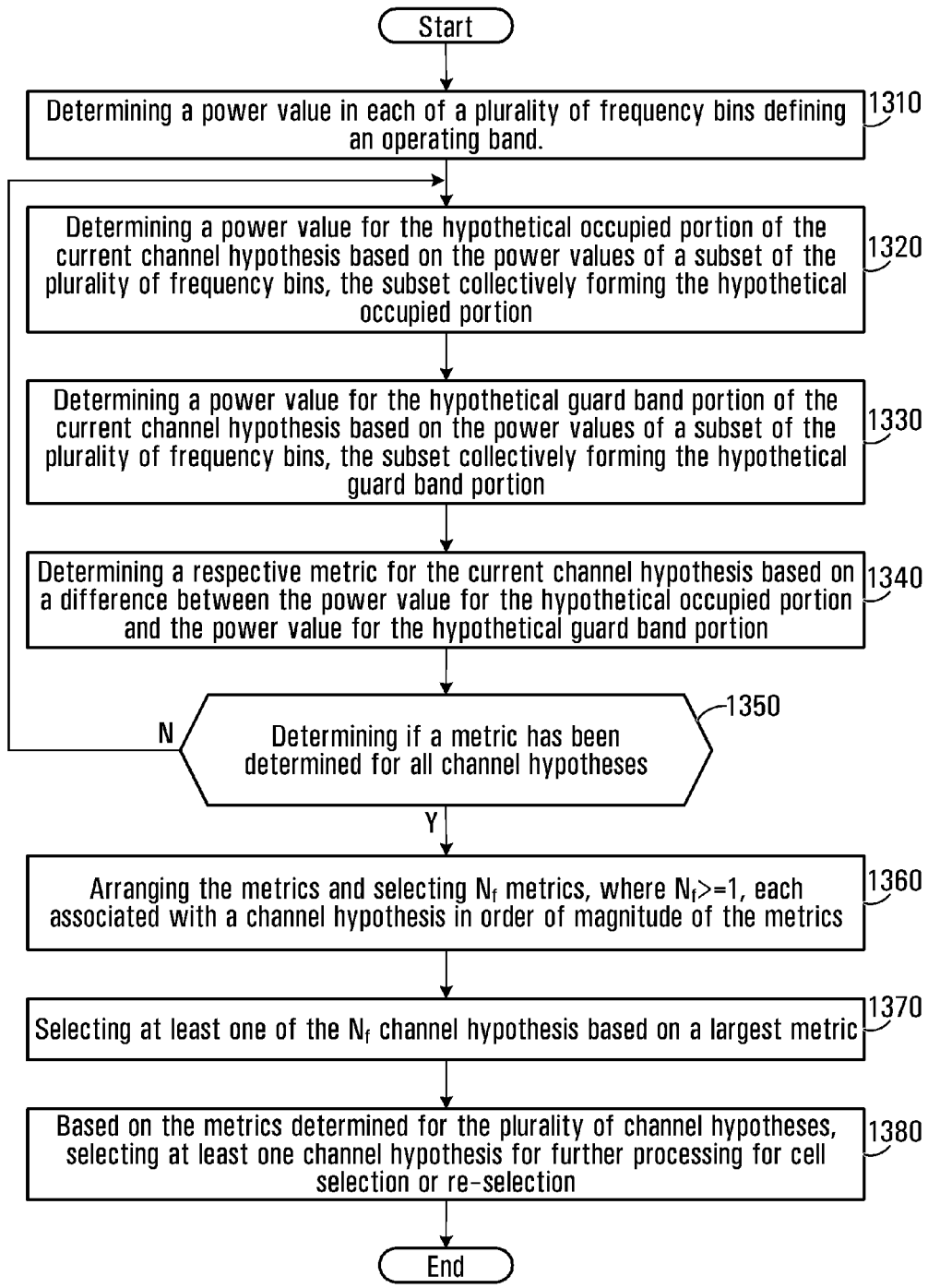
FIG. 13 is a flow chart illustrating a more detailed method according to an embodiment of the application.

FIG. 13 is a more detailed example of a method for aiding in telecommunication cell selection and re-selection in an operating band having a plurality of channels.

A first step 1310 involves determining a received power value in each of a plurality of frequency bins defining the operating band. Once the power of each of the plurality of frequency bins has been determined, a metric for each of a plurality of channel hypotheses, each channel hypothesis having a hypothetical occupied portion and a hypothetical guard band portion, is determined. Step 1320 involves determining a power value for the hypothetical occupied portion of the current channel hypothesis based on the power values of a subset of the plurality of frequency bins, the subset collectively forming the hypothetical occupied portion. A further step 1330 involves determining a power value for the hypothetical guard band portion of the current channel hypothesis based on the power values of a subset of the plurality of frequency bins, the subset collectively forming the hypothetical guard band portion. A further step 1340 involves determining a respective metric for the current channel hypothesis based on a difference between the power value for the hypothetical occupied portion and the power value for the hypothetical guard band portion. Step 1350 involves determining if a metric has been determined for all channel hypotheses. If a metric has been determined for all channel hypotheses, "Y" path of step 1350, the method proceeds to step 1360. If a metric has not been determined for all channel hypotheses, "N" path of step 1350, the method returns to step 1320. Step 1360 involves arranging the metrics and selecting $N_f$ metrics, where $N_f >= 1$, each associated with a channel hypothesis in order of magnitude of the metrics. Step 1370 involves selecting at least one of the $N_f$ channel hypotheses based on a largest metric. A further step 1380 involves, based on the metrics determined for the plurality of channel hypotheses, selecting at least one channel hypothesis for further processing for cell selection or re-selection.

In some embodiments a signal within the bandwidth defined by the channel hypothesis is an orthogonal frequency division multiplexed (OFDM) signal.

In some embodiments the power value for the hypothetical occupied portion is a sum of power values for a subset of a plurality of frequency bins that collectively form the hypothetical occupied portion divided by a number of frequency bins in the hypothetical occupied portion and the power value for the hypothetical guard band portion is a sum of power values for a subset of a plurality of frequency bins for the hypothetical guard portion divided by a number of frequency bins in the hypothetical guard band portion.

In some implementations the power in each frequency bin can be determined by, for each of a number of frequency bins collectively forming the channel hypothesis, filtering a received signal with a narrowband filter having a bandwidth substantially equal to a bandwidth of the frequency bin and measuring the power of the frequency bin.

In some implementations calculating a respective metric comprises performing an FFT of a signal in an operating band, the FFT having a resolution sufficient to determine the power in a frequency band so as to enable determining the power value in a hypothetical occupied portion and the power value in a hypothetical guard band portion of a channel hypothesis of a minimum size of the plurality of channel hypotheses.

In some implementations performing an FFT includes performing the FFT wherein the resolution is sufficient to differentiate the power of at least each frequency bin of the plurality of frequency bins and measuring the power of each of the frequency bins resulting from the FFT.

In some implementations performing the FFT includes performing at least two FFTs, one FFT for each of at least two bandwidths that collectively form the operating band.

Figure 14:
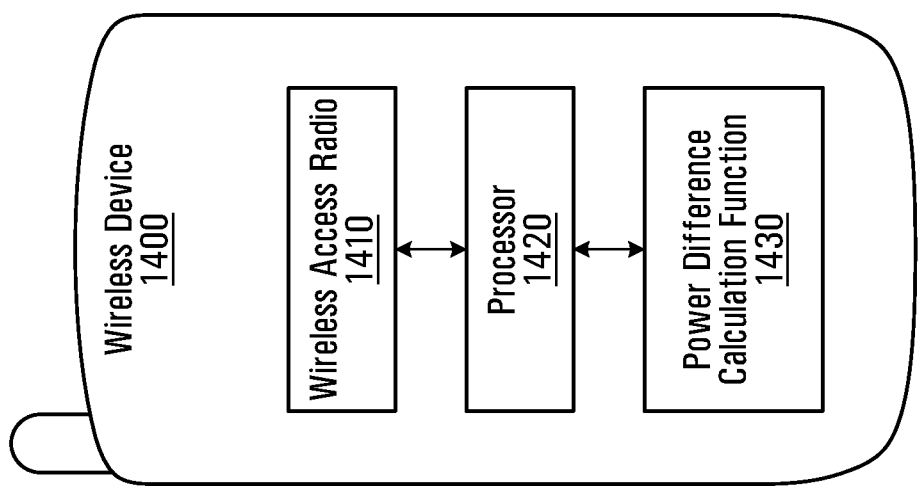
FIG. 14 is a block diagram of an example wireless device according to an implementation described herein.

Referring now to FIG. 14, shown is a block diagram of an example wireless device 1400 adapted to communicate using circuit switched and packet switched communications separately or simultaneously. The wireless device 1400 has a processor 1420 coupled to a wireless access radio 1410. The wireless access radio 1410 is broadly considered to be configured to communicate with wireless networks. In some embodiments, the wireless access radio may be implemented as more than one wireless access radio, each one configured to access a different type of network. The wireless device also has a Power Difference Calculation Function 1430 that is configured to operate in a manner consistent with the methods described above to calculate a power difference for evaluating multiple channel hypotheses and selecting channel hypotheses that meet particular criteria for further processing in cell selection and re-selection. Power Difference Calculation Function 1430, while illustrated as a single functional block in FIG. 14, may also be considered to have multiple sub-components, each sub-component configured to perform in a manner consistent with a portion of one or more of the example methods described above in FIGS. 8, 10, 12 and 13. In some embodiments the wireless device 1400 is a multi-mode wireless device.

In operation, the wireless device 1400 is adapted to communicate wirelessly over one or more types of wireless communication networks, for example a Universal Telecommunications Radio Access Network (UTRAN) network and a Generic Access Network (GAN), such as a Wi-Fi network, using the wireless access radio 1410. The wireless device 1400 is adapted to communicate using circuit switched and packet switched communications separately or simultaneously. In some embodiments, wireless access radio 1410 is configured to receive information broadcast by a network comprising characteristics pertaining to one or more telecommunication cells in the network. In some embodiments, the processor 1420 is configured to execute the Power Difference Calculation Function 1430. The Power Difference Calculation Function 1430 is configured to perform the various methods described above.

The Power Difference Calculation Function 1430 can be implemented using one of software, hardware, and firmware, or a suitable combination thereof. For example, application specific integrated circuits (ASIC) or field programmable gate arrays (FPGA) may be used to implement the function in hardware. To implement the function in software, in some embodiments, a microprocessor may be used that is capable of executing computer readable program code instructions.

The device of FIG. 14 shows only a wireless access radio 1410, a processor 1420 and a Power Difference Calculation Function 1430 relevant to performing a comparison of occupied bands and guard bands of potential channels for different bandwidth hypotheses. It is to be understood that practical implementations would include additional physical elements or functionality, or both, to that shown, for example, a wideband filter and Fourier transform based spectral analysis tool or a narrowband filter, or both, depending on the type of processing being performed, at least one ADC, at least one mixer for down converting received signals, and other receive signal circuitry. The preceding list is not considered to be exhaustive, but to act as an example of such additional physical elements or functionality.

Another Wireless Device

Figure 15:
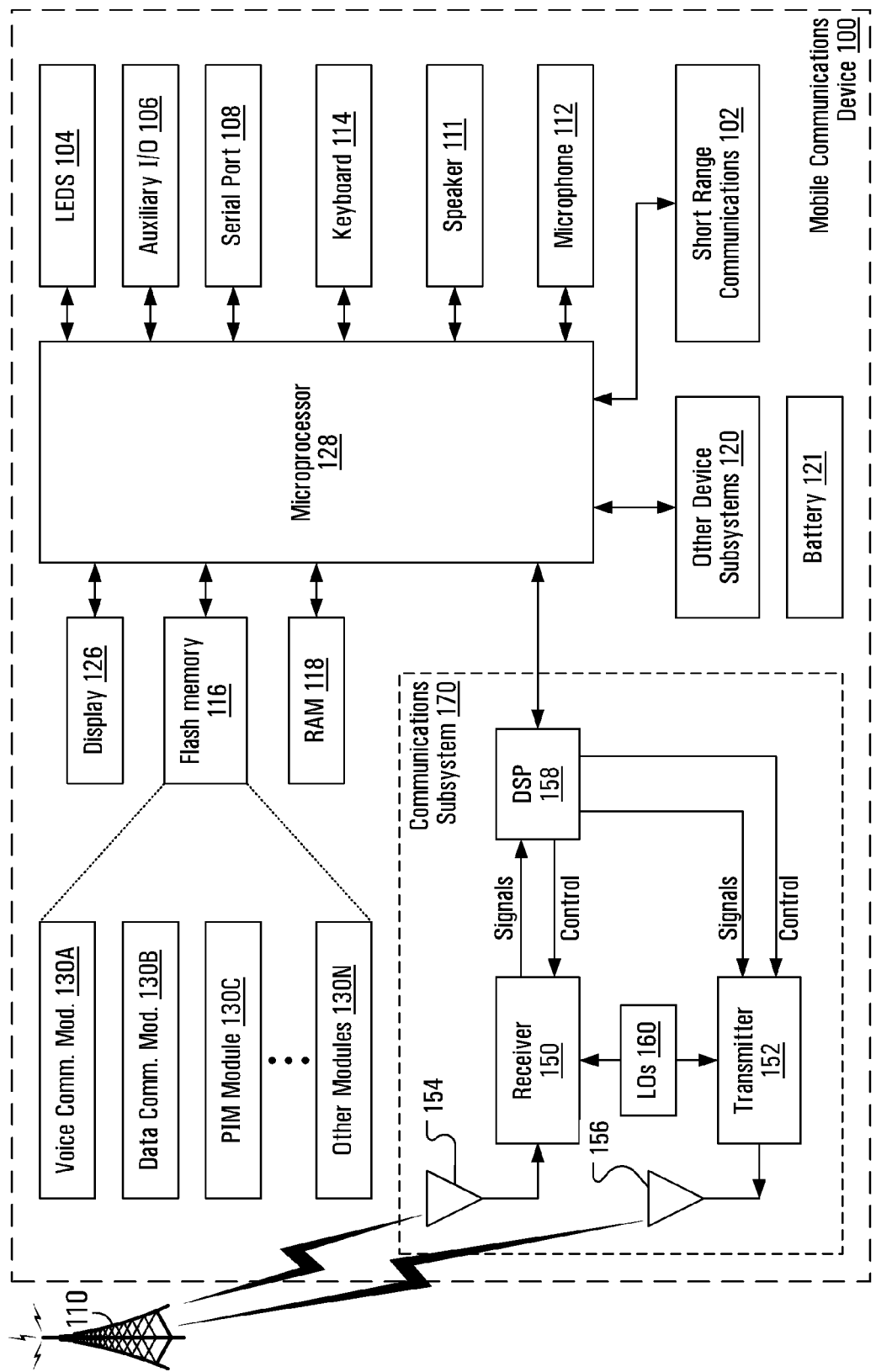
FIG. 15 is a block diagram of another wireless device.

Referring now to FIG. 15, shown is a block diagram of another wireless device 100 that may implement any of the wireless device methods described herein. The wireless device 100 is shown with specific components for implementing features described above, for example those generally illustrated in FIGS. 8, 10, 12 and 13. It is to be understood that the wireless device 100 is shown with very specific details for exemplary purposes only.

A processing device (a microprocessor 128) is shown schematically as coupled between a keyboard 114 and a display 126. The microprocessor 128 is a type of processor with features similar to those of the processor 1420 of the wireless device 1400 shown in FIG. 14. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. More generally, there may be more than one receive antenna or more than one transmit antenna, or both. In addition, the communication subsystem 170 also includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practised otherwise than as specifically described herein.

The invention claimed is:

1. A method comprising:
   for each of a plurality of channel hypotheses, each channel hypothesis having a hypothetical occupied portion and a hypothetical guard band portion, calculating a respective metric based on a power value for the hypothetical occupied portion and a power value for the hypothetical guard band portion; and
   based on the metrics determined for the plurality of channel hypotheses, selecting at least one channel hypothesis for further processing for cell selection or re-selection.

2. The method of claim 1 further comprising for each of the at least one channel hypothesis selected for further processing, attempting to perform at least one of:
   detecting a reference signal within a bandwidth defining the channel hypothesis;
   detecting a synchronization signal within a bandwidth defining the channel hypothesis; and
   identifying a cell operating within a bandwidth defining the channel hypothesis.

3. The method of claim 1 wherein calculating a respective metric comprises:
   determining a power value in each of a plurality of frequency bins defining an operating band that contains all of the hypothetical occupied portions and hypothetical guard band portions.

4. The method of claim 3 wherein calculating a respective metric comprises:
   for each hypothetical occupied portion, determining the power value for the hypothetical occupied portion based on the power values of a subset of the plurality of frequency bins, the subset collectively forming the hypothetical occupied portion; and for each hypothetical guard band portion, determining the power value for the hypothetical guard band portion based on the power values of a subset of the plurality of frequency bins, the subset collectively forming the hypothetical guard band portion.

5. The method of claim 4 wherein determining the respective metric is based on a difference between the power value for the hypothetical occupied portion and the power value for the hypothetical guard band portion.

6. The method of claim 5 wherein the difference comprises: a sum of power values for the subset of the plurality of frequency bins for the hypothetical occupied portion divided by a number of frequency bins in the hypothetical occupied portion minus a sum of power values for the subset of the plurality of frequency bins for the hypothetical guard band portion divided by a number of frequency bins in the hypothetical guard band portion.

7. The method of claim 5 wherein the difference comprises: a logarithm of the ratio of a sum of power values for the subset of the plurality of frequency bins for the hypothetical occupied portion to a number of frequency bins in the hypothetical occupied portion minus a logarithm of the ratio of a sum of power values for the subset of the plurality of frequency bins for the hypothetical guard band portion to a number of frequency bins in the hypothetical guard band portion.

8. The method of claim 3 wherein determining power in each frequency bin comprises:
   filtering a received signal with a narrowband filter having a bandwidth substantially equal to a bandwidth of the frequency bin; and
   measuring the power of the frequency bin.

9. The method of claim 1 wherein calculating a respective metric comprises:
   performing at least one discrete Fourier transform (DFT) to produce a power value for each of a plurality of frequency bins.

10. The method of claim 9, wherein calculating a respective metric comprises:
    for each hypothetical occupied portion, determining the power value for the hypothetical occupied portion based on the power values of a subset of the plurality of frequency bins, the subset collectively forming the hypothetical occupied portion; and
    for each hypothetical guard band portion, determining the power value for the hypothetical guard band portion based on the power values of a subset of the plurality of frequency bins, the subset collectively forming the hypothetical guard band portion.

11. The method of claim 9, wherein performing at least one DFT comprises performing a respective DFT for each of at least two bandwidths that collectively form an operating band that contains all of the hypothetical occupied portions and hypothetical guard band portions.

12. The method of claim 1 wherein selecting the at least one channel hypothesis for further processing comprises:
    arranging the metrics and selecting $N_f$ metrics, where $N_f \geq 1$, each associated with a channel hypothesis, in order of magnitude of the metrics; and
    selecting at least one of the $N_f$ channel hypotheses based on a largest magnitude metric.

13. The method of claim 1 wherein the plurality of channel hypotheses comprise channel hypotheses for two or more different sized bandwidths located at each of a plurality of carrier frequencies in an operating band that contains all of the hypothetical occupied portions and hypothetical guard band portions.

14. The method of claim 13 wherein the two or more different sized bandwidths comprise bandwidths equal to at least two of: 1.4 MHz; 3 MHz; 5 MHz; 10 MHz; 15 MHz; and 20 MHz.

15. The method of claim 3 wherein determining a power value in each of a plurality of frequency bins comprises performing multiple power measuring passes of the frequency bins in the operating band.

16. The method of claim 3 wherein determining a power value in each of a plurality of frequency bins comprises performing a received signal strength indicator (RSSI) measurement for each of the frequency bins.

17. The method of claim 15, wherein a delay is included between consecutive passes of the multiple power measuring passes.

18. The method of claim 17, wherein the delay time is increased with each consecutive pass.

19. The method of claim 1, wherein a start of a hypothetical guard band portion may be adjusted by moving it away from a nominal transmission band edge by a margin corresponding to a maximum expected frequency offset.

20. The method of claim 5, further comprising, upon determining the respective metric:
    stopping evaluation of candidate carrier frequencies early if the metric exceeds a threshold; and
    proceeding directly to searching for synchronization signals.

21. A wireless device comprising:
    a processor;
    a Power Difference Calculation function configured to:
       for each of a plurality of channel hypotheses, each channel hypothesis having a hypothetical occupied portion and a hypothetical guard band portion, calculate a respective metric based on a power value for the hypothetical occupied portion and a power value for the hypothetical guard band portion;
       based on the metrics determined for the plurality of channel hypothesis, select at least one channel hypothesis for further processing.

22. The wireless device of claim 21 wherein the Power Difference Calculation function configured to calculate a respective metric is configured to:
    determine a power value in each of a plurality of frequency bins defining an operating band that contains all of the hypothetical occupied portions and hypothetical guard band portions.

23. The wireless device of claim 22 wherein the Power Difference Calculation function configured to calculate a respective metric is configured to:
    for each hypothetical occupied portion, determine the power value for the hypothetical occupied portion based on the power values of a subset of the plurality of frequency bins, the subset collectively forming the hypothetical occupied portion; and
    for each hypothetical guard band portion, determine the power value for the hypothetical guard band portion based on the power values of a subset of the plurality of frequency bins, the subset collectively forming the hypothetical guard band portion.

24. The wireless device of claim 22 wherein the Power Difference Calculation function configured to calculate a respective metric is configured to:
    determine the respective metric based on a difference between the power value for the hypothetical occupied portion and the power value for the hypothetical guard band portion.

* * * * *